US011653304B2

(12) United States Patent
Elshafie et al.

(10) Patent No.: US 11,653,304 B2
(45) Date of Patent: May 16, 2023

(54) RESOURCE CONFIGURATION FOR RADIO FREQUENCY ENERGY-HARVESTING

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/232,411

(22) Filed: Apr. 16, 2021

(65) Prior Publication Data
US 2022/0338122 A1    Oct. 20, 2022

(51) Int. Cl.
| | | |
|---|---|---|
| *H04W 52/02* | (2009.01) | |
| *H04L 5/14* | (2006.01) | |
| *H04L 41/0803* | (2022.01) | |
| *H04W 52/36* | (2009.01) | |
| *H04W 72/04* | (2009.01) | |

(52) U.S. Cl.
CPC ........... *H04W 52/0235* (2013.01); *H04L 5/14* (2013.01); *H04L 41/0803* (2013.01); *H04W 52/36* (2013.01); *H04W 72/042* (2013.01)

(58) Field of Classification Search
CPC ................. H04L 5/14; H04L 41/0803; H04W 52/0235; H04W 52/36; H04W 72/042
See application file for complete search history.

(56) References Cited

U.S. PATENT DOCUMENTS

| | | | | |
|---|---|---|---|---|
| 9,118,217 | B2* | 8/2015 | Rofougaran | H02J 50/20 |
| 9,270,139 | B2* | 2/2016 | Rofougaran | G06F 1/266 |
| 10,070,287 | B2* | 9/2018 | Lee | H04L 67/12 |
| 10,236,726 | B2* | 3/2019 | Khan | H02J 50/20 |
| 10,361,596 | B1* | 7/2019 | Al-Habob | H02J 50/50 |
| 10,383,126 | B2* | 8/2019 | Gollakota | H04L 12/10 |
| 10,411,764 | B2* | 9/2019 | Lee | H04B 5/0037 |
| 10,454,320 | B1* | 10/2019 | Al-Habob | H02J 50/50 |
| 10,505,404 | B1* | 12/2019 | Al-Habob | H02J 50/50 |
| 10,541,567 | B2* | 1/2020 | Kim | H02J 50/80 |
| 10,819,164 | B2* | 10/2020 | Kim | H04L 27/2614 |
| 11,095,169 | B2* | 8/2021 | Kim | H02J 50/27 |
| 11,296,819 | B2* | 4/2022 | Kim | H04L 1/0025 |

(Continued)

FOREIGN PATENT DOCUMENTS

| | | | | |
|---|---|---|---|---|
| CN | 105682238 A | * | 6/2016 | |
| CN | 106233559 A | * | 12/2016 | H02J 17/00 |

(Continued)

OTHER PUBLICATIONS

International Search Report and Written Opinion—PCT/US2022/071348—ISA/EPO—dated Jul. 8, 2022.

*Primary Examiner* — Eric Nowlin
(74) *Attorney, Agent, or Firm* — Qualcomm Incorporated

(57) ABSTRACT

Disclosed are techniques for radio frequency energy harvesting (RF-EH). In an aspect, a device (e.g., UE, BS, etc.) transmits a time division duplex (TDD) resource configuration that includes an indication of a set of symbols associated with RF-EH. The devices transmit energy on resources associated with the first set of symbols. The UE performs dedicated RF-EH on resources associated with the first of symbols (e.g., to harvest the RF energy transmitted by the device).

52 Claims, 21 Drawing Sheets

(56) References Cited

U.S. PATENT DOCUMENTS

| | | | |
|---|---|---|---|
| 2007/0173214 A1* | 7/2007 | Mickle | H02J 50/70 455/127.1 |
| 2011/0218014 A1* | 9/2011 | Abu-Qahouq | H02J 50/001 320/108 |
| 2012/0091799 A1* | 4/2012 | Rofougaran | H02J 50/12 307/29 |
| 2015/0303741 A1* | 10/2015 | Malik | H02J 50/20 307/104 |
| 2015/0333563 A1* | 11/2015 | Rofougaran | H02J 50/10 713/310 |
| 2016/0285518 A1* | 9/2016 | Gong | H02J 50/80 |
| 2017/0257728 A1* | 9/2017 | Lee | H04W 72/04 |
| 2018/0063835 A1* | 3/2018 | Abedini | H04W 72/042 |
| 2018/0109150 A1* | 4/2018 | Khan | H02J 50/80 |
| 2018/0198488 A1* | 7/2018 | Tomasi | H04W 72/048 |
| 2019/0089207 A1* | 3/2019 | Kim | H02J 50/40 |
| 2019/0132028 A1* | 5/2019 | Lee | H04B 5/0037 |
| 2019/0280530 A1* | 9/2019 | Navarro | H02J 50/23 |
| 2020/0106308 A1* | 4/2020 | Kim | H04W 52/24 |
| 2021/0119726 A1* | 4/2021 | Kim | H04B 7/0602 |
| 2022/0078779 A1* | 3/2022 | Xu | H04W 72/0446 |
| 2022/0174673 A1* | 6/2022 | Park | H04W 72/0453 |
| 2022/0183064 A1* | 6/2022 | Talarico | H04W 74/0808 |

FOREIGN PATENT DOCUMENTS

| | | | | |
|---|---|---|---|---|
| CN | 105682238 B | * | 12/2018 | |
| CN | 110784882 A | * | 2/2020 | |
| CN | 113424625 A | * | 9/2021 | H02J 50/001 |
| EP | 3927062 A1 | * | 12/2021 | H02J 50/001 |
| EP | 4088386 A1 | * | 11/2022 | H02J 50/20 |
| JP | 2022520252 A | * | 3/2022 | |
| KR | 20210047768 A | * | 10/2019 | |
| KR | 20210061606 A | * | 5/2021 | |
| KR | 102272645 B1 | * | 7/2021 | |
| KR | 102278037 B1 | * | 7/2021 | |
| WO | WO-2015160436 A1 | * | 10/2015 | H02J 17/00 |
| WO | WO-2020164437 A1 | * | 8/2020 | H02J 50/001 |
| WO | WO-2020236664 A1 | | 11/2020 | |
| WO | WO-2021139893 A1 | * | 7/2021 | H02J 50/20 |

* cited by examiner

→ Data    ---► ACK/NACK

---► Control

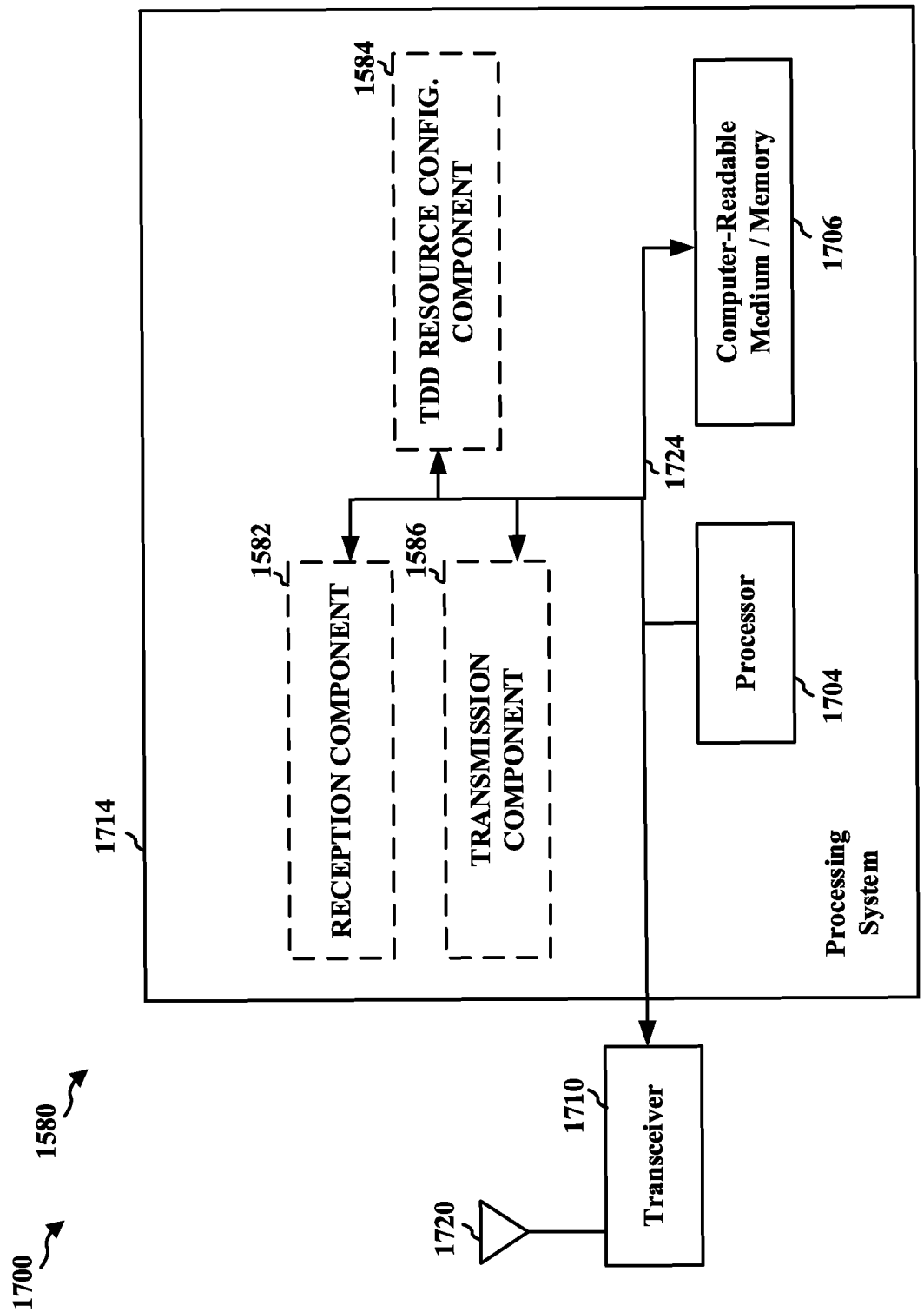

RESOURCE CONFIGURATION FOR RADIO FREQUENCY ENERGY-HARVESTING

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Radio frequency energy harvesting (RF-EH) may be used to prolong the battery lifetime of various user equipments (UEs) (e.g., wearables, etc.). RF-EH may also provide incentives for devices to cooperative and relay other signals. RF-EH is typically implemented at the receiving device in an opportunistic manner on signals for communication, without actual coordination with the transmission (or energy) source. Signals for communication are typically transmitted at a lowest power level suitable for communication so as to reduce power consumption at a transmitting device, reduce interference, and so on. Accordingly, opportunistic RF-EH on signals for communication may be limited in terms of energy transfer.

Aspects of the disclosure are thereby directed to a TDD resource configuration that includes an indication of a set of symbols (e.g., energy or "E" symbols) associated with RF-EH rather than communication or gaps to facilitate communication. One or more RF-EH-capable UEs may perform dedicated RF-EH on resources associated with these E symbols in the TDD resource configuration. Such aspects may provide various technical advantages, such as improved energy transfer (e.g., transmission power can be increased or maximized on E symbols to enhance energy transfer, whereby signals for communication are typically transmitted at a lowest power level suitable for communication so as to reduce interference).

In an aspect, a method of operating a user equipment (UE) that is radio frequency energy-harvesting (RF-EH)-capable includes receiving a time division duplex (TDD) resource configuration that includes an indication of a first set of symbols associated with RF-EH; and performing dedicated RF-EH on resources associated with the first set of symbols.

In an aspect, a method of operating a device includes transmitting a time division duplex (TDD) resource configuration that includes an indication of a first set of symbols associated with radio frequency energy-harvesting (RF-EH); and transmitting energy on resources associated with the first set of symbols.

In an aspect, a user equipment (UE) includes a memory; a communication interface; and at least one processor communicatively coupled to the memory and the communication interface, the at least one processor configured to: receive, via the communication interface, a time division duplex (TDD) resource configuration that includes an indication of a first set of symbols associated with RF-EH; and perform dedicated RF-EH on resources associated with the first set of symbols.

In an aspect, a device includes a memory; a communication interface; and at least one processor communicatively coupled to the memory and the communication interface, the at least one processor configured to: cause the communication interface to transmit a time division duplex (TDD) resource configuration that includes an indication of a first set of symbols associated with radio frequency energy-harvesting (RF-EH); and cause the communication interface to transmit energy on resources associated with the first set of symbols.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 17 is a diagram illustrating an example of a hardware implementation for an apparatus employing a processing system.

DETAILED DESCRIPTION

Figure 1:
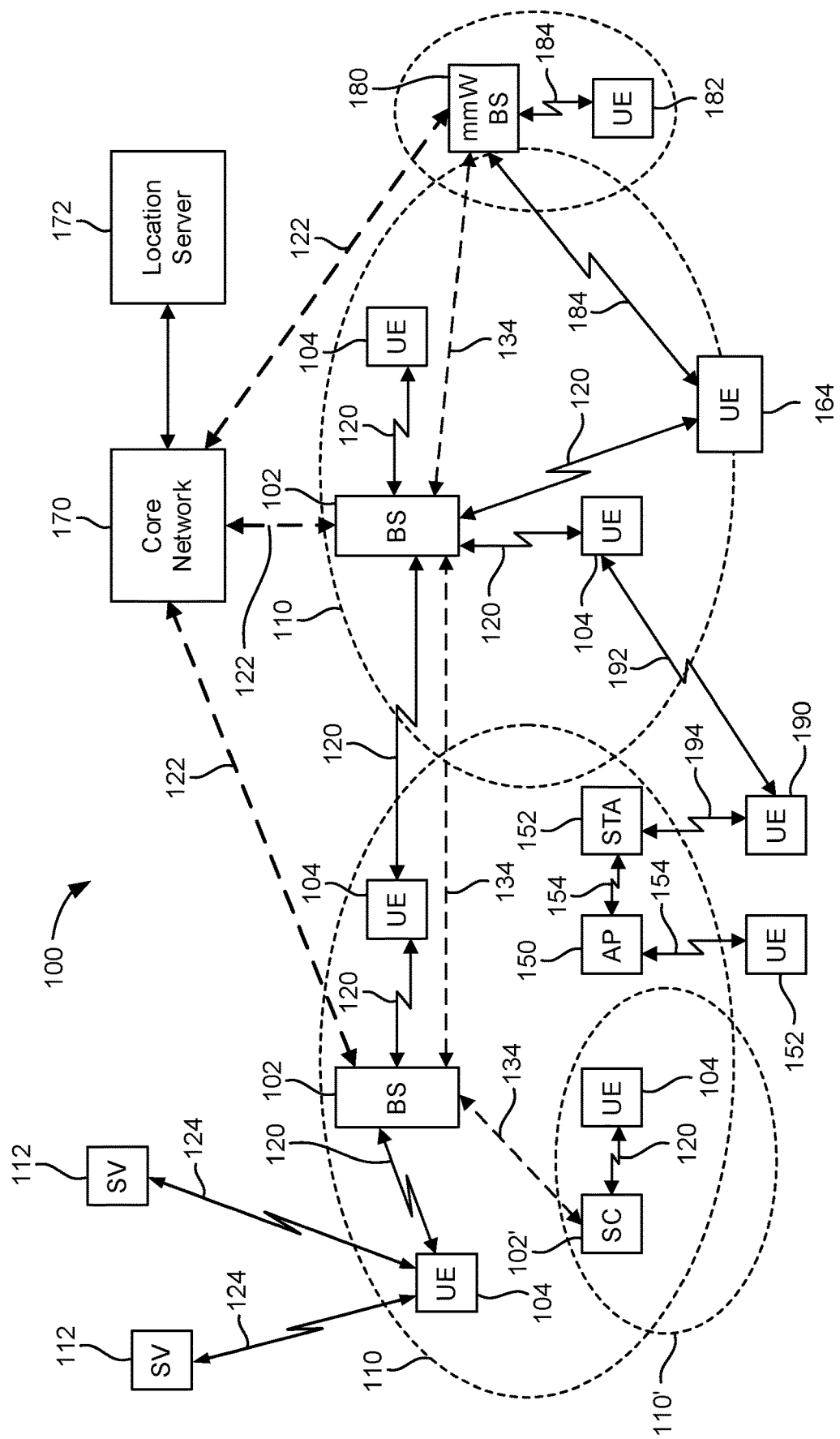
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
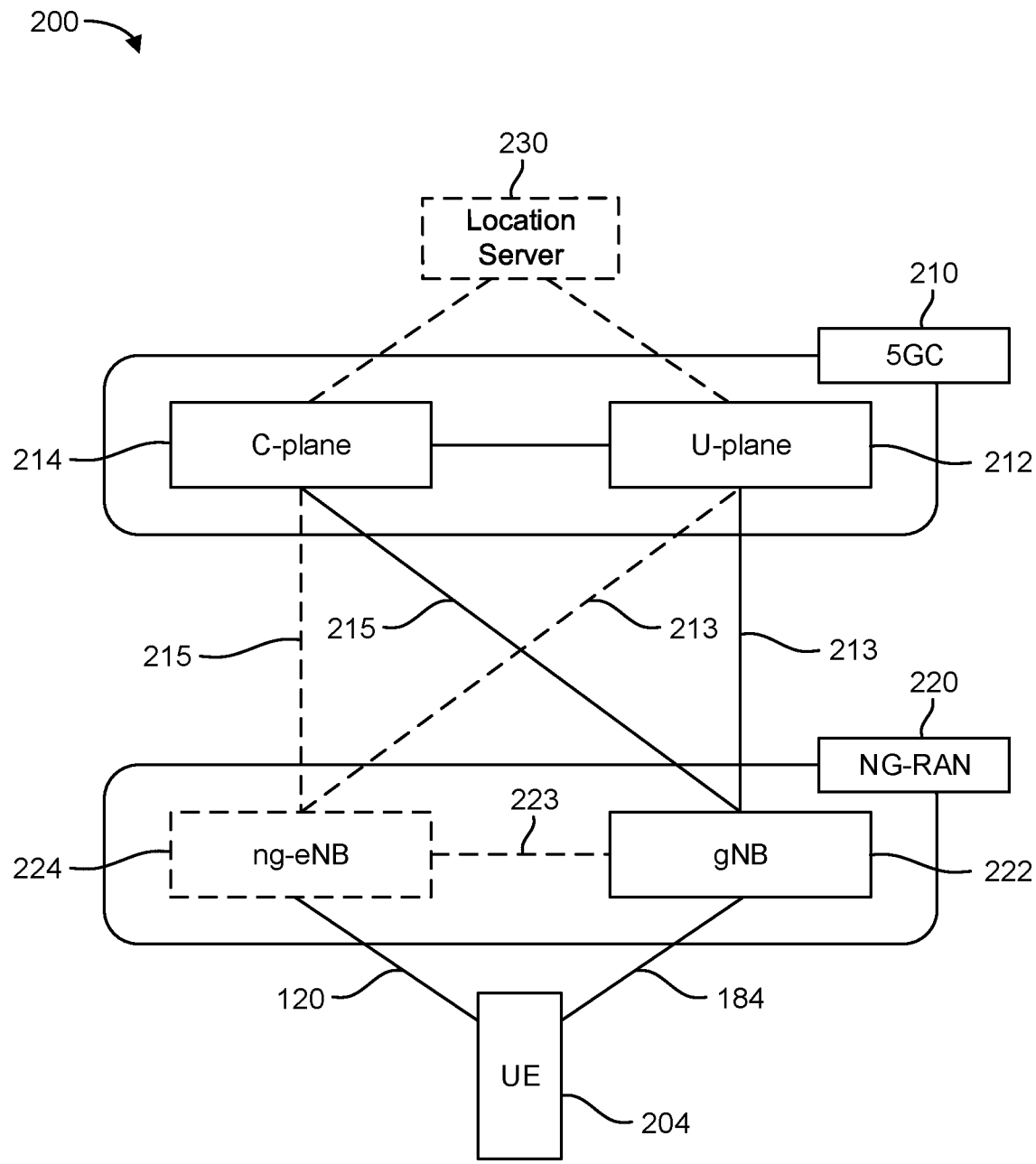
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
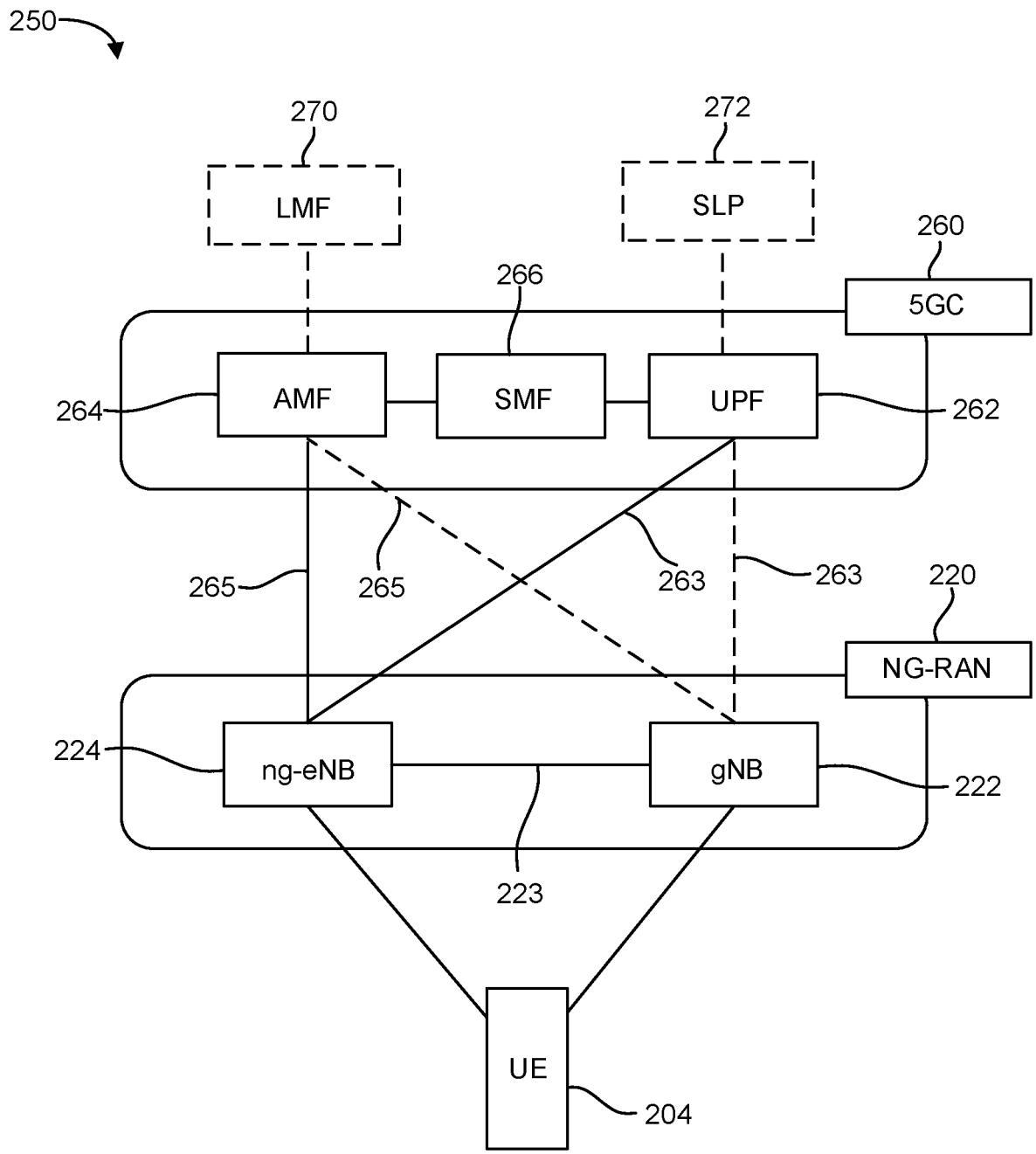

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
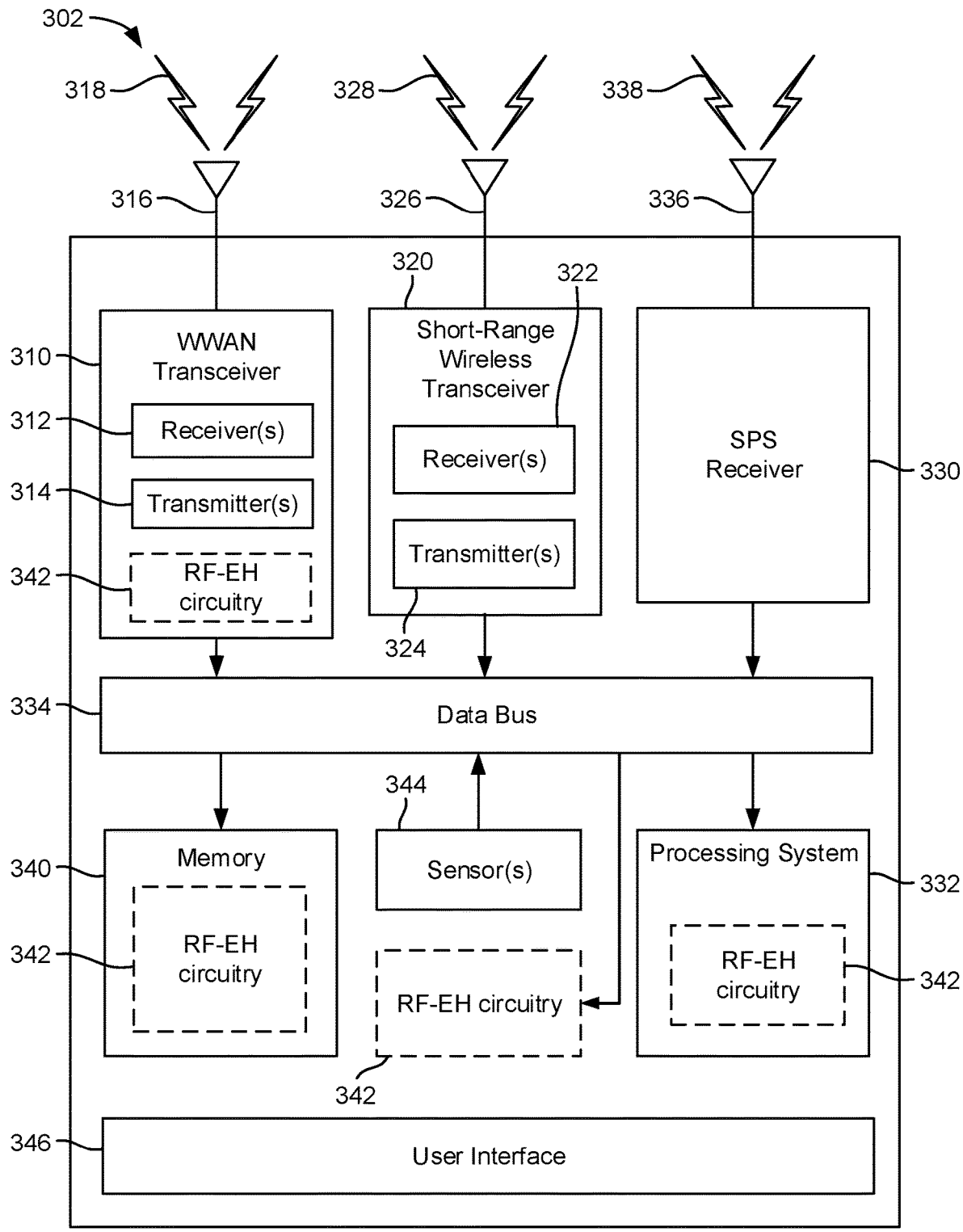
FIGS. 3A to 3C are simplified block diagrams of several sample aspects of components that may be employed in a user equipment (UE), a base station, and a network entity, respectively, and configured to support communications as taught herein.
Figure 3B:
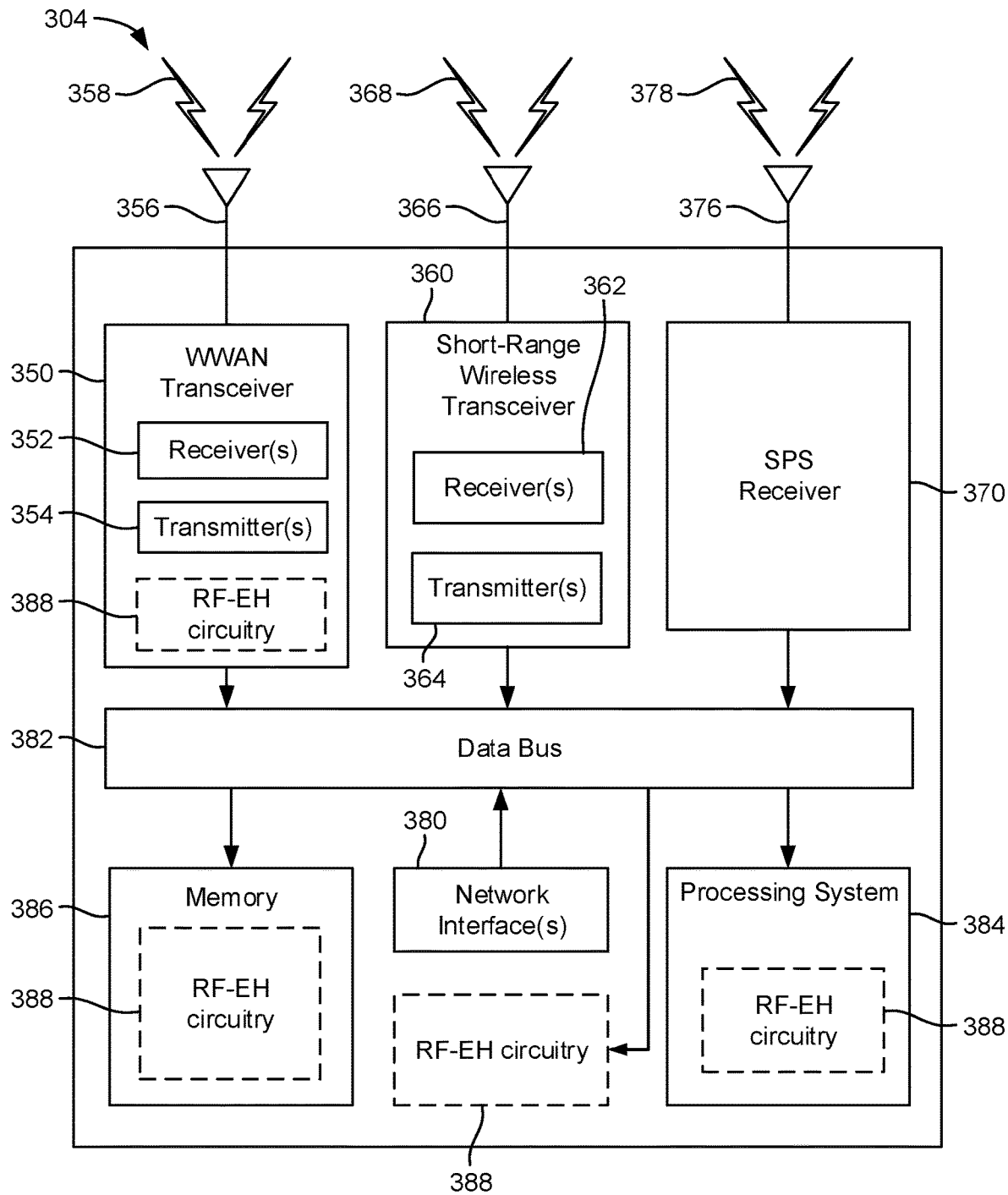
Figure 3C:
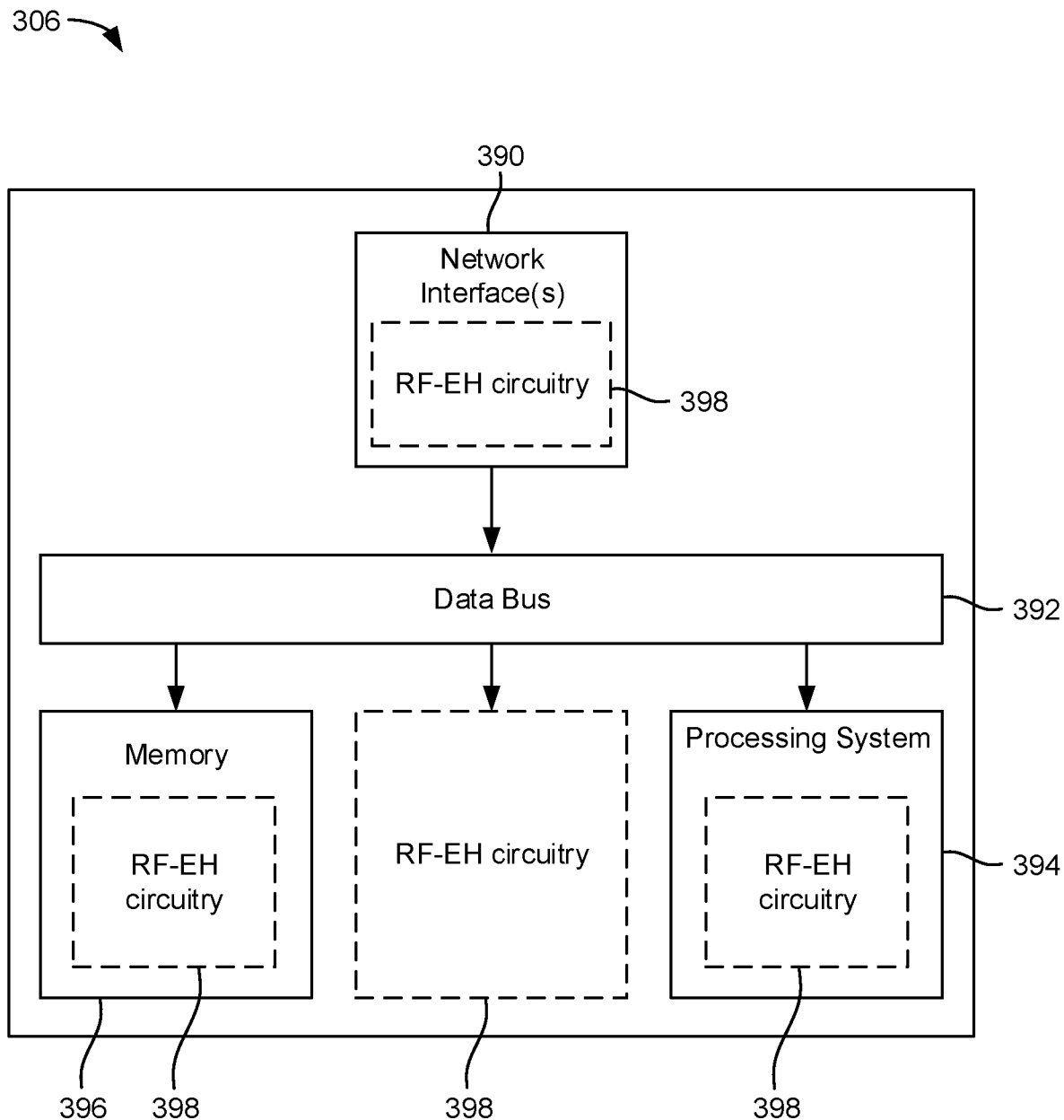

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the WWAN transceiver 310 and/or the short-range wireless transceiver 320 may form a (wireless) communication interface of the UE 302. Similarly, the WWAN transceiver 350, the short-range wireless transceiver 360, and/or the network interface(s) 380 may form a (wireless) communication interface of the base station 304. Likewise, the network interface(s) 390 may form a (wireless) communication interface of the network entity 306.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include RF-EH circuitry 342, 388, and 398, respectively. The RF-EH circuitry 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF-EH circuitry 342, 388, and 398 may be external to the processing systems 332, 384, and 394 (e.g., part of a modem processing system, integrated with another processing system, etc.). Alternatively, the RF-EH circuitry 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the RF-EH circuitry 342, which may be part of the WWAN transceiver 310, the memory component 340, the processing system 332, or any combination thereof, or may be a standalone component. FIG. 3B illustrates possible locations of the RF-EH circuitry 388, which may be part of the WWAN transceiver 350, the memory component 386, the processing system 384, or any combination thereof, or may be a standalone component. FIG. 3C illustrates possible locations of the RF-EH circuitry 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the RF-EH circuitry 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Various types of wireless energy-harvesting (EH) are implemented on UEs (e.g., electromagnetic charging such as Qi wireless charging, wind-based charging, solar-based charging, vibration-based charging, etc.). Another type of wireless charging is RF-EH. RF sources can provide a controllable and substantially constant energy transfer over distance for RF-EH-capable UEs. In a fixed RF-EH network, the harvested energy is predictable and relatively stable over time due to fixed distance.

Using random multipath fading channel model, the energy harvested at node j from a transmitting node i is given by $$E_j = \eta P_i |g_{i-j}|^2 T \quad \text{Equation 1}$$

where $P_i$ is the transmit power by node i, $g_{i-j}$ is the channel coefficient of the link between node i and node j, T is the time allocated for energy harvesting, and $\eta$ is the RF-to-DC conversion efficiency.

Figure 4:
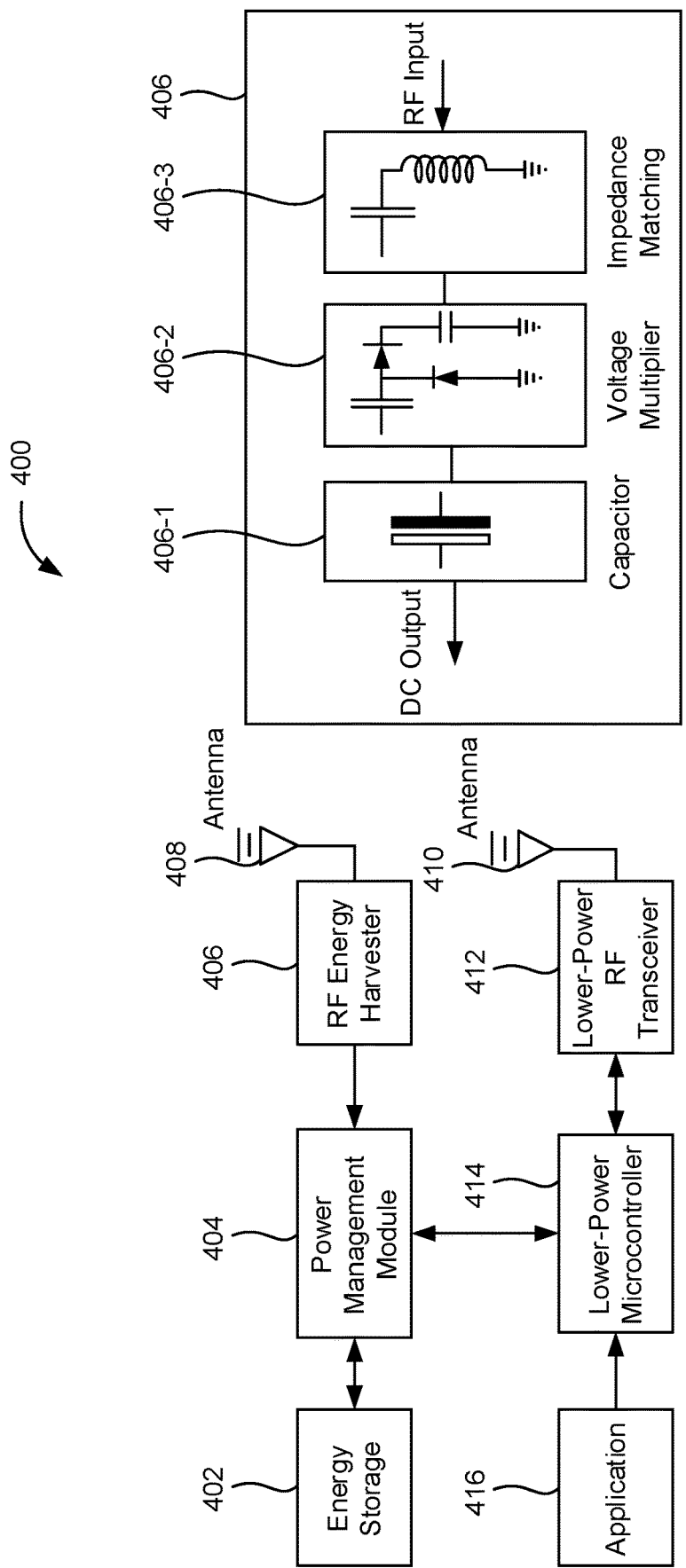
FIG. 4 illustrates an RF-EH-capable UE in accordance with an aspect of the disclosure

FIG. 4 illustrates an RF-EH-capable UE 400 in accordance with an aspect of the disclosure. In some designs, the RF-EH-capable UE 400 may correspond to an example implementation of UE 302. The RF-EH-capable UE 400 includes an energy storage unit 402 (e.g., a battery), a power management module 404 (e.g., which decides whether to store the electricity obtained from RF-EH or to use it for information transmission immediately), RF-EH circuitry 406 (e.g., to collect RF signals and convert them into electricity), antennas 408-410, a lower-power RF transceiver 412 (e.g., for information transmission or reception), a lower-power microcontroller 414 (e.g., to process data), and an application 410. The RF-EH circuitry 406 includes a capacitor 406-1, a voltage multiplier 406-2 and an impedance matching module 406-3. Generally, the modules 402-408 are associated with RF-EH, while the modules 410-416 are associated with communication. The RF-EH-capable UE 400 constitutes an example of a separated receiver architecture, as will be described in more detail below with respect to FIG. 5A. in particular, antenna 408 is dedicated to RF-EH circuitry 406, while antenna 410 is dedicated to communication circuitry (e.g., without antenna re-use, or switching or power-splitting RF-EH circuitry and communication circuitry).

Figure 5A:
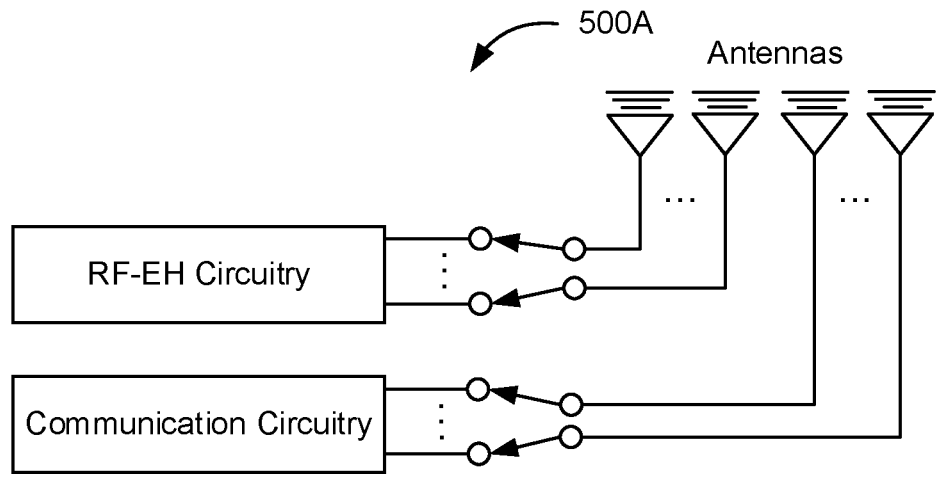
FIG. 5A depicts an RF-EH architecture (e.g., a separated receiver architecture) in accordance with an aspect of the disclosure.

FIG. 5A depicts an RF-EH architecture 500A (e.g., a separated receiver architecture) in accordance with an aspect of the disclosure. In FIG. 5A, the RF-EH architecture 500A includes a first set of antennas dedicated to RF-EH and coupled to RF-EH circuitry, and a second set of antennas dedicated to communication and coupled to communication circuitry. The RF-EH architecture 500A of FIG. 5A has a low complexity (e.g., no switching or power-splitting hardware, etc.), which may be advantageous for some applications. However, the RF-EH architecture 500A of FIG. 5A may be more expensive than other RF-EH architectures due to the inclusion of additional antennas dedicated to RF-EH. While the RF-EH architecture 500A depicts an example where the RF-EH circuitry includes a bank (or array) of antennas, in other designs, any number of antennas may be dedicated to the RF-EH circuitry. Likewise, while the RF-EH architecture 500A depicts an example where the communication circuitry includes a bank (or array) of antennas, in other designs, any number of antennas may be dedicated to the communication circuitry.

Figure 5B:
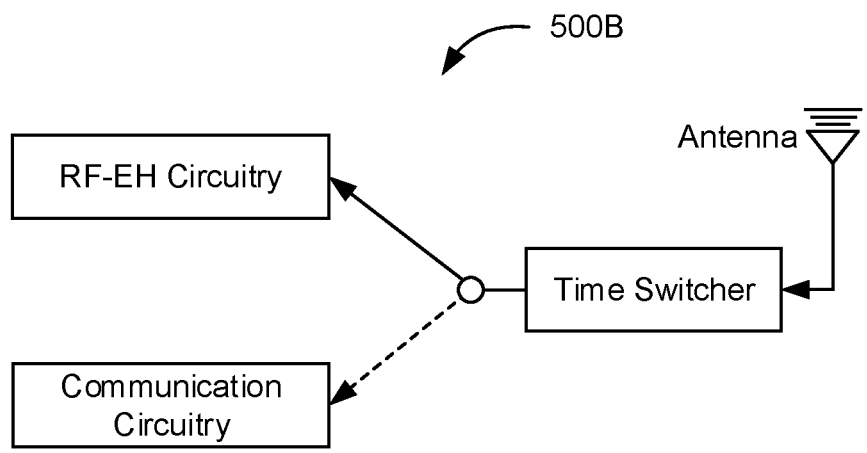
FIG. 5B depicts an RF-EH architecture (e.g., a time-switching architecture) in accordance with another aspect of the disclosure.

FIG. 5B depicts an RF-EH architecture 500B (e.g., a time-switching architecture) in accordance with another aspect of the disclosure. In FIG. 5B, the RF-EH architecture 500B includes a set of antennas that can, at different times, be alternately switched by a time switcher between RF-EH circuitry and communication circuitry. In this case, at any given time, the set of antennas can be used for RF-EH or communication, but not both at the same time. The RF-EH architecture 500B of FIG. 5B is more complex than the RF-EH architecture 500A of FIG. 5A due to the time-switching, but is more efficient in terms of antenna re-use. Generally, the RF-EH architecture 500B of FIG. 5B is suited for scenarios where the communication circuitry will not be used continuously, since the communication circuitry must be switched off to perform RF-EH. While the RF-EH architecture 500B depicts a single antenna being time-switched between the RF-EH circuitry and the communication circuitry, such a depiction is for convenience of explanation. In other designs, any number of antennas may be time-switched as described above.

Figure 5C:
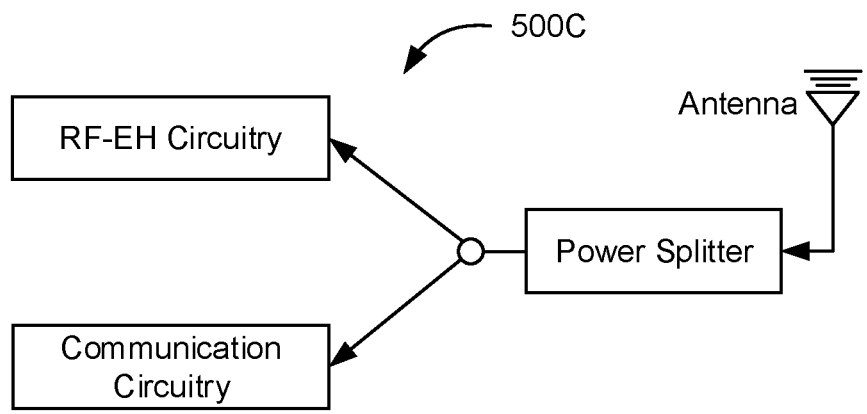
FIG. 5C depicts an RF-EH architecture (e.g., a power-splitting architecture) in accordance with another aspect of the disclosure.

FIG. 5C depicts an RF-EH architecture 500C (e.g., a power-splitting architecture) in accordance with another aspect of the disclosure. In FIG. 5C, the RF-EH architecture 500C includes a set of antennas coupled to a power splitter that splits RF power between RF-EH circuitry and communication circuitry. In this case, at any given time, the set of antennas can be used for both RF-EH and communication. The RF-EH architecture 500C of FIG. 5C is more complex than the RF-EH architecture 500A of FIG. 5A due to the power-splitting, but is more efficient in terms of antenna re-use. Also, unlike the RF-EH architecture 500B of FIG. 5B, the RF-EH architecture 500C of FIG. 5C may be particularly well suited for scenarios where the communication circuitry may at times be used continuously, since the communication circuitry need not be switched off to perform RF-EH. In some designs, the power splitter may allocate full RF power to either the RF-EH circuitry or the communication circuitry, which may approximate the operation of the time switcher from the RF-EH architecture 500B of FIG. 5B. While the RF-EH architecture 500B depicts a single antenna being power-split between the RF-EH circuitry and the communication circuitry, such a depiction is for convenience of explanation. In other designs, any number of antennas may be power-split as described above.

Figure 6A:
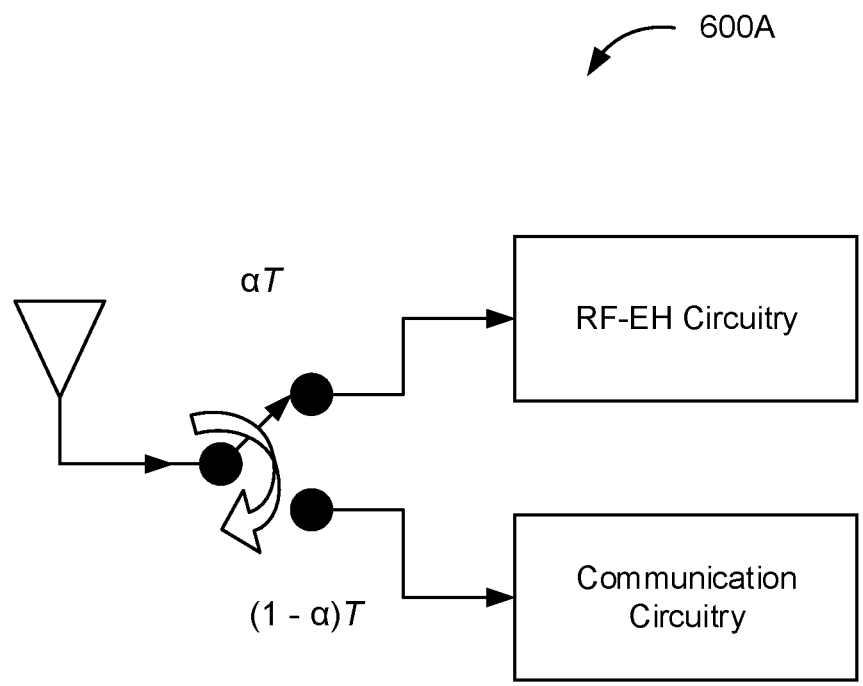
FIG. 6A illustrates a time-switching RF-EH architecture in accordance with an aspect of the disclosure.

FIG. 6A illustrates a time-switching RF-EH architecture 600A in accordance with an aspect of the disclosure. The time-switching RF-EH architecture 600A depicts a more detailed example of the RF-EH architecture 500B of FIG. 5B. The time-switching RF-EH architecture 600A allows the RF-EH-capable UE to switch between communication circuitry or RF-EH circuitry. As noted above with to FIG. 5B, a time-switching RF-EH architecture permits the re-use of antennas for both RF-EH circuitry and communication circuitry, which may help to reduce the total number of antennas of a respective UE, which may in turn help drive down the associated cost. Moreover, a time-switching RF-EH architecture is suited for scenarios where the communication circuitry will not be used continuously, since the communication circuitry must be switched off to perform RF-EH. The energy harvested at receiver j from source i can be calculated as follows:

$$E_j = \eta P_i |g_{i-j}|^2 \alpha T \quad \text{Equation 2}$$

where $0 \leq \alpha \leq 1$ is the fraction of time allocated for energy harvesting. Letting K and W denote the noise spectral density and channel bandwidth, the data rate is given by:

$$R_{i-j} = (1-\alpha)\log_2\left(1 + \frac{|g_{i-j}|^2 P_i}{\kappa W}\right) \quad \text{Equation 3}$$

Figure 6B:
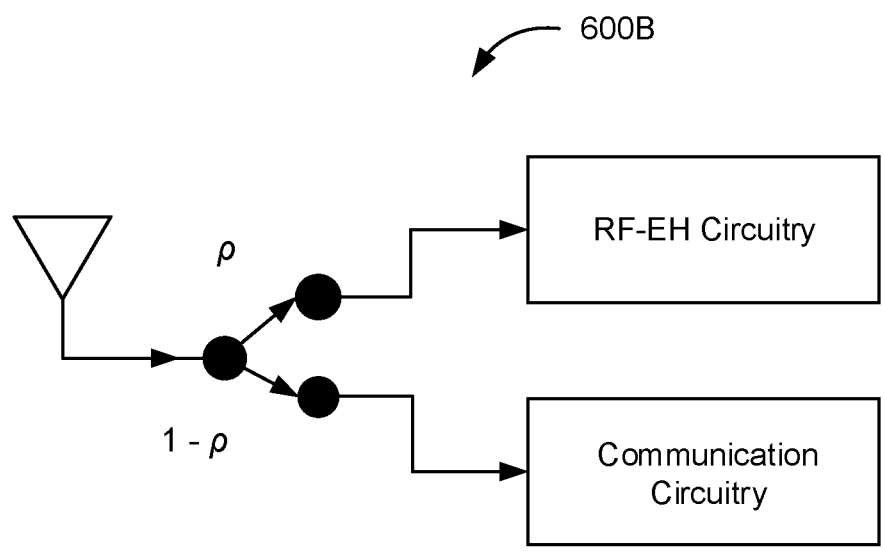
FIG. 6B illustrates a power-splitting RF-EH architecture in accordance with an aspect of the disclosure.

FIG. 6B illustrates a power-splitting RF-EH architecture 600B in accordance with an aspect of the disclosure. The time-switching RF-EH architecture 600B depicts a more detailed example of the RF-EH architecture 500C of FIG. 5C. As noted above with to FIG. 5C, a power-splitting RF-EH architecture permits the re-use of antennas for both RF-EH circuitry and communication circuitry, which may help to reduce the total number of antennas of a respective UE, which may in turn help drive down the associated cost. Moreover, a power-splitting RF-EH architecture is suited for scenarios where the communication circuitry may at times be used continuously, since the communication circuitry need not be switched off to perform RF-EH.

In the power-splitting RF-EH architecture 600B, the received RF signals are split into two streams for the communication circuitry and RF-EH circuitry with different power levels. The energy harvested at receiver j from source i can be calculated as:

$$E_j = \eta \rho_i |g_{i-j}|^2 T \qquad \text{Equation 4}$$

where $0 \leq p \leq 1$ is the fraction of power allocated for energy harvesting, with the data rate is given by:

$$R_{i-j} = \log_2\left(1 + \frac{|g_{i-j}|^2(1-\rho)P_i}{\kappa W}\right) \qquad \text{Equation 5}$$

In some RF-EH implementations, sidelink transmissions (e.g., UE-to-UE transmissions) are used for RF-EH. Sidelink communications take place in transmission or reception resource pools. In some designs, the minimum resource allocation unit is a sub-channel in frequency, and resource allocation in time is one slot. Some slots are not available for sidelink. Some slots contain feedback resources. RRC configuration can be pre-configured (e.g., preloaded on UE) or network-configured (e.g., by gNB).

Various physical sidelink channels can be used for sidelink communication and/or RF-EH, including Physical sidelink control channel (PSCCH), Physical sidelink shared channel (PSSCH), Physical sidelink feedback channel (PSFCH), and Physical sidelink broadcast channel (PSBCH). Various sidelink reference signals can be used for sidelink communication and/or RF-EH, including Demodulation RS (DMRS) for PSCCH, Demodulation RS (DMRS) for PSSCH, Demodulation RS (DMRS) for PSBCH, Channel state information RS (CSI-RS), Primary synchronization signal (S-PSS), Secondary synchronization signal (S-SSS), and Phase-tracking RS (PTRS) for FR2 only.

In some designs, a slot may include 14 OFDM symbols including resource arranged in accordance with a time division duplex (TDD) resource configuration. In some designs, sidelink can be configured (e.g., pre-configured or dynamically configured) to occupy fewer than 14 symbols in a slot. In some designs, the first symbol is repeated on the preceding symbol for automatic gain control (AGC) settling. In some designs, the sub-channel size can be configured (e.g., pre-configured or dynamically configured) to {10, 15, 20, 25, 50, 75, 100} physical resource blocks (PRBs). In some designs, the PSCCH and PSSCH are always transmitted in the same slot.

Figure 7A:
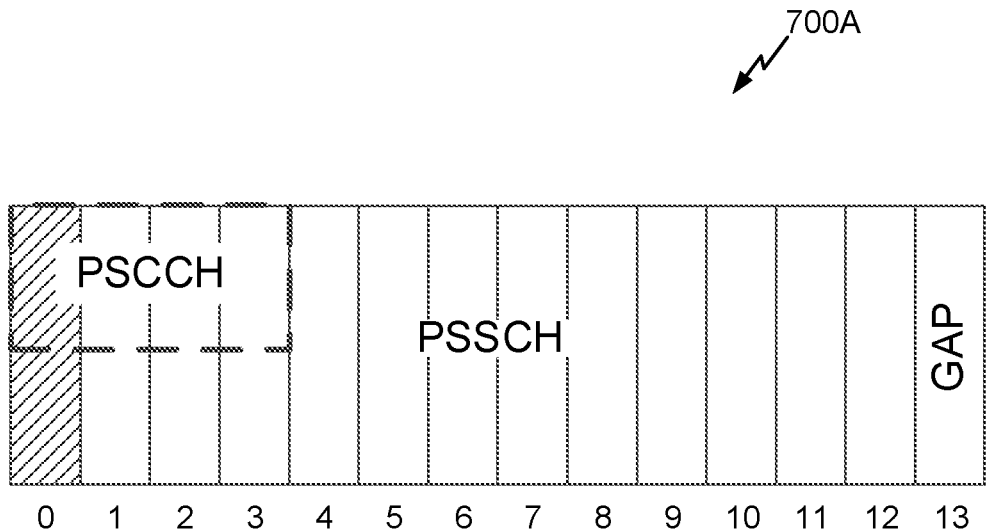
FIG. 7A illustrates a TDD resource configuration in accordance with an aspect of the disclosure

FIG. 7A illustrates a TDD resource configuration 700A in accordance with an aspect of the disclosure. In particular, the TDD resource configuration 700A is associated with sidelink communication. The TDD resource configuration 700A includes 14 OFDM symbols denoted as symbols 0 through 13. In the TDD resource configuration 700A of FIG. 7A, a gap symbol is configured at symbol 13 following PSSCH at symbol 12. The TDD resource configuration 700A merely depicts one example TDD resource configuration, and other TDD resource configurations are possible. Generally, the sidelink channels depicted in FIG. 7A are analogous in some ways to downlink and uplink channels. For example, the PSCCH is similar to the physical uplink control channel (PUCCH) or physical downlink control channel (PDSCH), and carries control information. Further, the PSSCH is similar to the physical uplink shared channel (PUSCH) or physical downlink shared channel (PDSCH), and carries data communication (e.g., as will be explained below in more detail, this data communication may comprise group-cast, broadcast and/or unicast data communication).

Figure 7B:
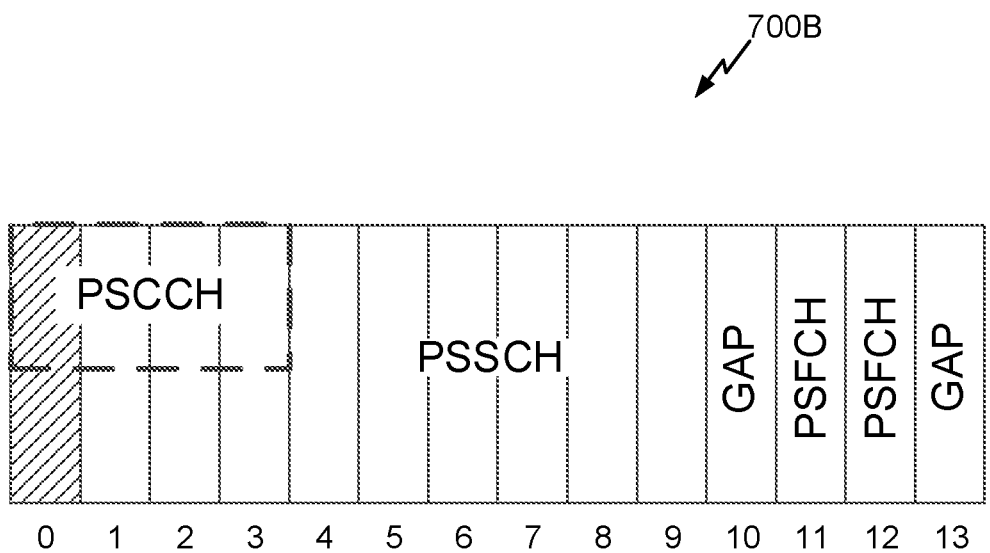
FIG. 7B illustrates a TDD resource configuration in accordance with another aspect of the disclosure.

FIG. 7B illustrates a TDD resource configuration 700B in accordance with another aspect of the disclosure. In particular, the TDD resource configuration 700B is associated with sidelink communication. Unlike the TDD resource configuration 700A of FIG. 7A, the TDD resource configuration 700B includes OFDM symbols allocated to PSFCH. For example, PSCFH may be used to provide sidelink feedback, such as HARQ feedback (e.g., ACK/NACK). For example, some or all of the PSSCH may be associated with multicast or group-cast communications, and the PSFCH symbol(s) may provide one or more of the target UEs in a respective group to provide HARQ feedback related to the group-cast PSSCH communication(s).

In particular, the TDD resource configuration 700B includes 14 OFDM symbols denoted as symbols 0 through 13. In the TDD resource configuration 700B of FIG. 7B, a PSSCH at symbol 9 is followed by a first gap at symbol 10, which is followed by PSFCH at symbols 11-12, which is followed by a second gap at symbol 13. In FIG. 7B, the PSFCH is repeated at symbol 12 for AGC settling. In some designs, the PSFCH can be configured with a period of {0, 1, 2, 4} slots.

In some designs, sidelink control information is in two stages for forward compatibility. A first stage control (SCI-1) is transmitted on PSCCH and contains information for resource allocation and decoding second stage control. A second stage control (SCI-2) is transmitted on PSSCH and contains information for decoding data (SCH). SCI-1 will be decodable by UEs in all releases, whereas new SCI-2 formats can be introduced in future releases. This ensures that new features can be introduced while avoiding resource collisions between releases. Both SCI-1 and SCI-2 use the PDCCH polar code.

Figure 8A:
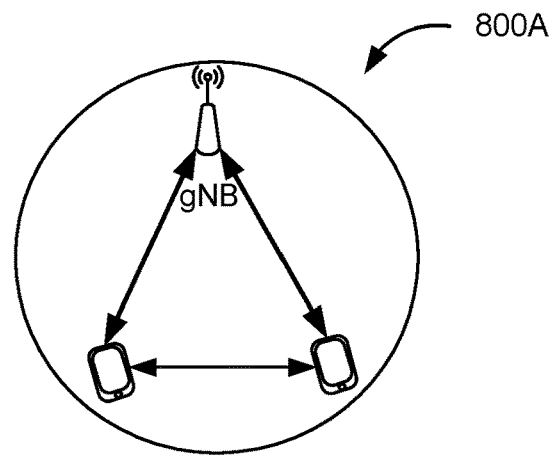
FIG. 8A illustrates an in-coverage (IC) scenario in accordance with an aspect of the disclosure

FIG. 8A illustrates an in-coverage (IC) scenario 800A in accordance with an aspect of the disclosure. In FIG. 8A, sidelink (SL) UEs are connected via UMTS air interface (or "Uu" interface) to a 5G core network (or "5GC"), SL authorization and provisioning via Uu necessary to support SL operation, and gNB may control the SL discovery/communication resource allocation. In some designs, RF-EH may be implemented on sidelink signaling exchanged between the respective UEs. However, if one or more of the UEs are relatively close to the gNB, RF-EH may be implemented on signaling exchanged between the UE(s) and the gNB. The signaling between the respective UEs and/or between the UE(s) and the gNB may be implemented via broadcast, group-cast or unicast, as will be described in more detail below with respect to FIGS. 9A-9C. In some designs, Uu communication may be implemented concurrently with SL communication. In some designs, Uu communication may include control information that is used to manage some or all of the SL communication between the UEs.

Figure 8B:
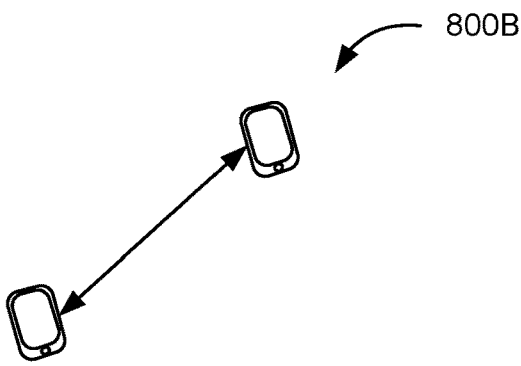
FIG. 8B illustrates an out-of-coverage (00C) scenario in accordance with an aspect of the disclosure.

FIG. 8B illustrates an out-of-coverage (OOC) scenario 800B in accordance with an aspect of the disclosure. In FIG. 8B, SL are UEs not connected to 5GS, SL UEs must operate without authorization and provisioning via Uu, and SL UEs are pre-configured SL provisioning information for discovery/communication support. In some designs, RF-EH may be implemented on sidelink signaling exchanged between the respective UEs. The signaling between the respective UEs may be implemented via broadcast, group-cast or unicast, as will be described in more detail below with respect to FIGS. 9A-9C. Unlike FIG. 8A, Uu communication is not supported by the respective UEs in some designs (e.g., the respective UEs are Wi-Fi-only devices, or the UEs are cellular-capable but there is no gNB available or in-range, etc.).

Figure 8C:
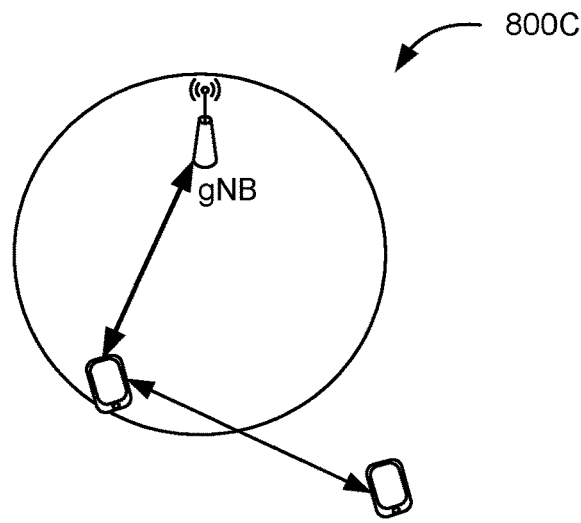
FIG. 8C illustrates a partial coverage (PC) scenario in accordance with an aspect of the disclosure.

FIG. 8C illustrates a partial coverage (PC) scenario 800C in accordance with an aspect of the disclosure. In FIG. 8C, one UE is connected via Uu to 5GC, another UE may or may not be connected to 5GS, one UE connects to 5GC using the UE in coverage (e.g., relay operation), and both UEs may support authorization/provisioning via Uu and pre-configured SL provisioning. In some designs, RF-EH may be implemented on sidelink signaling exchanged between the respective UEs. However, if the in-coverage UE is relatively close to the gNB, RF-EH may be implemented on signaling exchanged between the in-coverage UE and the gNB. The signaling between the respective UEs and/or between the in-coverage UE and the gNB may be implemented via broadcast, group-cast or unicast, as will be described in more detail below with respect to FIGS. 9A-9C. In some designs, Uu communication may be implemented concurrently with SL communication. In some designs, Uu communication may include control information that is used to manage some or all of the SL communication between the UEs.

Figure 9A:
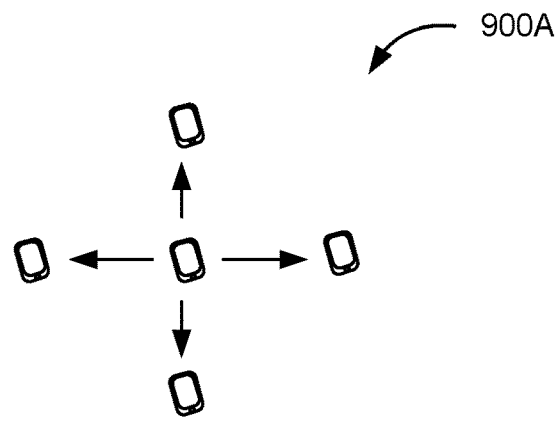
FIG. 9A illustrates a sidelink communication scenario in accordance with an aspect of the disclosure.

FIG. 9A illustrates a sidelink communication scenario 900A in accordance with an aspect of the disclosure. In FIG. 9A, sidelink broadcast is implemented, whereby sidelink signals are transmitted one-to-many (e.g., sent to all users of a service) via blind transmission only, and with a predefined Destination ID per service. In some designs, sidelink broadcast may be implemented for RF-EH. For example, the broadcasting UE in FIG. 9A may be configured as a dedicated charging UE that provides power to proximate UEs in a particular area. Alternatively, the broadcasting UE in FIG. 9A may transmit data signals that are opportunistically energy harvested at one or more of the respective proximate UEs. In some designs, a subset of the target UEs may perform RF-EH on the sidelink broadcast signals (e.g., in addition to communication processing, or in lieu of communication processing in case of a time-switching RF-EH architecture), while another subset of the target UEs do not perform RF-EH (e.g., communication processing only). In either case, RF-EH is conventionally implemented in a receiver-centric manner without coordination with the RF-EH source.

Figure 9B:
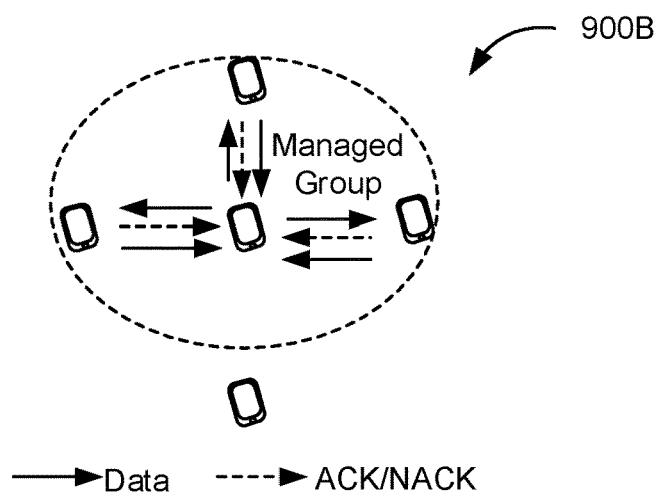
FIG. 9B illustrates a sidelink communication scenario in accordance with another aspect of the disclosure.

FIG. 9B illustrates a sidelink communication scenario 900B in accordance with another aspect of the disclosure. In FIG. 9B, sidelink groupcast is implemented, whereby sidelink signals are transmitted one-to-many to a group of users identified by a group ID, with ACK/NACK-based retransmission, and with a destination ID learnt through application server or preconfigured. In some designs, sidelink groupcast may be implemented for RF-EH. In some designs, the group-casting UE in FIG. 9B may transmit data signals that are opportunistically energy harvested at one or more of the respective proximate UEs. In some designs, a subset of the target UEs may perform RF-EH on the sidelink group-cast signals (e.g., in addition to communication processing, or in lieu of communication processing in case of a time-switching RF-EH architecture), while another subset of the target UEs do not perform RF-EH (e.g., communication processing only). In either case, RF-EH is conventionally implemented in a receiver-centric manner without coordination with the RF-EH source. In some designs, feedback (e.g., ACK/NACK) may be sent back to the group-casting UE via a feedback channel, such as PSFCH as depicted in FIG. 7B.

Figure 9C:
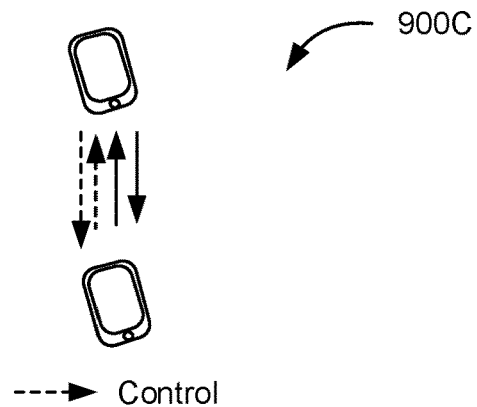
FIG. 9C illustrates a sidelink communication scenario in accordance with another aspect of the disclosure.

FIG. 9C illustrates a sidelink communication scenario 900C in accordance with another aspect of the disclosure. In FIG. 9C, sidelink unicast is implemented, whereby sidelink signals are transmitted one-to-one (e.g., L2 link setup and maintenance), with ACK/NACK-based retransmission, and with a destination ID learnt through application server or preconfigured. In some designs, sidelink unicast may be implemented for RF-EH. In some designs, the transmitting UE in FIG. 9C may transmit data signals that are opportunistically energy harvested at the target UE. In some designs the target UE may perform RF-EH on the sidelink unicast signals (e.g., in addition to communication processing, or in lieu of communication processing in case of a time-switching RF-EH architecture). As noted above, RF-EH is conventionally implemented in a receiver-centric manner without coordination with the RF-EH source.

Figure 10A:
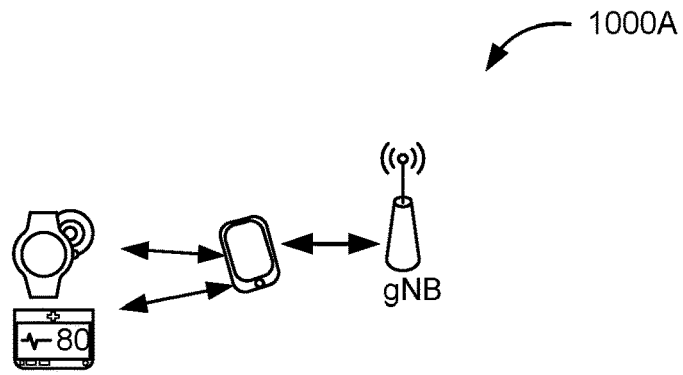
FIG. 10A illustrates a wearable use-case in accordance with an aspect of the disclosure.

FIG. 10A illustrates a wearable use-case 1000A in accordance with an aspect of the disclosure. In FIG. 10A, smartwatch (e.g., with or without 5G modem) and a health monitoring device connected to the smartphone via SL. In FIG. 10A, the smartphone is shown as supporting UE-to-NW relay operation, although SL-only operation may be implemented. In some designs, wearable devices such as smartwatches, health monitoring devices, etc. may be good candidates for RF-EH due to their relatively low battery life and the inconvenience (or impracticality) of having the user remove the wearable devices for charging. Some health monitoring devices (e.g., pacemakers, etc.) may even be implemented into the user's body. In case of FIG. 10A, RF-EH circuitry may be equipped on the smartwatch and the health monitoring device, with SL communications from the smartphone being opportunistically harvested at the smartwatch and the health monitoring device. As noted above, the RF-EH circuitry may be implemented in accordance with a separated received architecture (e.g., as in FIG. 5A), a time-switching architecture (e.g., as in FIG. 5B or 6A) or a power-splitting architecture (e.g., as in FIG. 5C or 6B).

Figure 10B:
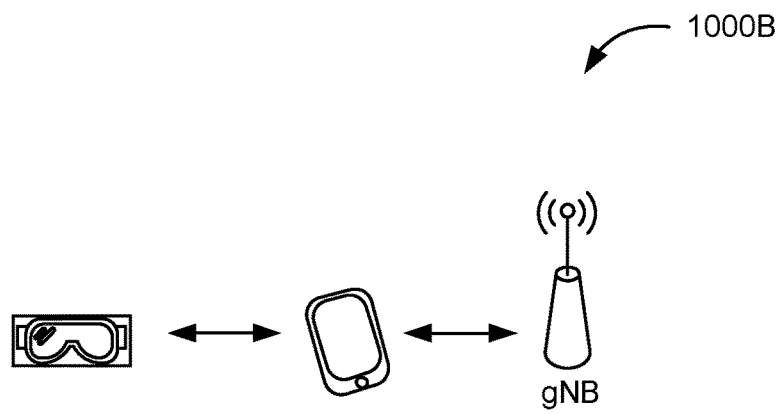
FIG. 10B illustrates a wearable use-case in accordance with another aspect of the disclosure.

FIG. 10B illustrates a wearable use-case 1000B in accordance with another aspect of the disclosure. In FIG. 10B, an XR Head-Mounted Display (HMD) is connected to a smartphone via SL. In FIG. 10B, the smartphone is shown as supporting UE-to-NW relay operation, although SL-only operation may be implemented. In some designs, wearable devices such as HMDs may be good candidates for RF-EH due to their relatively low battery life and the inconvenience of having the user remove the HMD for charging. In case of FIG. 10B, RF-EH circuitry may be equipped on the HMD, with SL communications from the smartphone being opportunistically harvested at the HMD. As noted above, the RF-EH circuitry may be implemented in accordance with a separated received architecture (e.g., as in FIG. 5A), a time-switching architecture (e.g., as in FIG. 5B or 6A) or a power-splitting architecture (e.g., as in FIG. 5C or 6B).

Figure 10C:
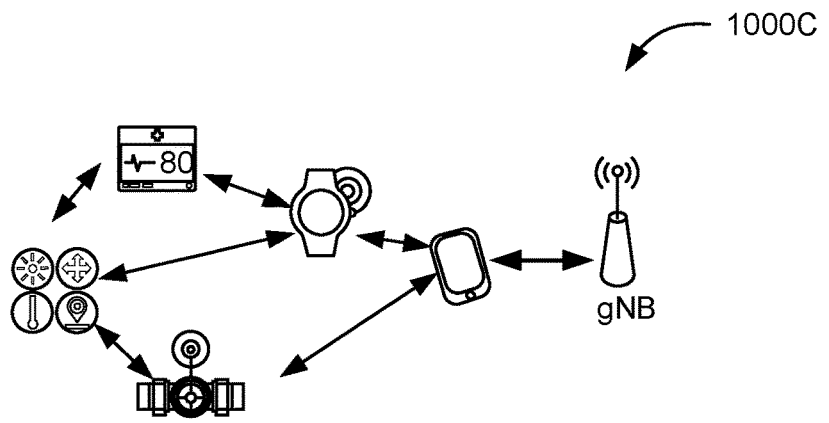
FIG. 10C illustrates a wearable use-case in accordance with another aspect of the disclosure.

FIG. 10C illustrates a wearable use-case 1000C in accordance with another aspect of the disclosure. In FIG. 10C, various sensors are communicating (directly or indirectly) with a smartphone via SL. In FIG. 10C, the smartphone is shown as supporting UE-to-NW relay operation, although SL-only operation may be implemented. As shown in FIG. 10C, some sensors may communicate amongst themselves (e.g., smart thermostat and entry key) or for mesh (e.g., UE-to-UE relay) over SL. In some designs, wearable devices such as smartwatches, health monitoring devices, sensors, etc. may be good candidates for RF-EH due to their relatively low battery life and the inconvenience (or impracticality) of having the user remove the wearable devices for charging. Some health monitoring devices (e.g., pacemakers, etc.) may even be implemented into the user's body. Moreover, some sensors may be installed behind walls or other obstructed locations, which makes wired-based charging mechanisms impractical. In case of FIG. 10C, RF-EH circuitry may be equipped on the sensors (e.g., smartwatch, the health monitoring device, thermostat, etc.), with SL communications from the smartphone being opportunistically harvested at the respective sensors. As noted above, the RF-EH circuitry may be implemented in accordance with a separated received architecture (e.g., as in FIG. 5A), a time-switching architecture (e.g., as in FIG. 5B or 6A) or a power-splitting architecture (e.g., as in FIG. 5C or 6B).

RF-EH may be used to prolong the battery lifetime of various UEs (e.g., wearables, etc.). RF-EH may also provide incentives for devices to cooperative and relay other signals. RF-EH is typically implemented at the receiving device in an opportunistic manner, without actual coordination with the transmission (or energy) source.

Aspects of the disclosure are thereby directed to a TDD resource configuration that includes an indication of a set of symbols (e.g., energy or "E" symbols) associated with RF-EH rather than communication or gaps to facilitate communication. One or more RF-EH-capable UEs may perform dedicated RF-EH on resources associated with these E symbols in the TDD resource configuration. For example, a time-switching RF-EH architecture may switch to RF-EH circuitry for harvesting energy on the E symbols, or a power-splitting RF-EH architecture may allocate full power to RF-EH circuitry on the E symbols, etc. Such aspects may provide various technical advantages, such as improved energy transfer (e.g., transmission power can be increased or maximized on E symbols to enhance energy transfer, whereby signals for communication are typically transmitted at a lowest power level suitable for communication so as to reduce interference).

Figure 11:
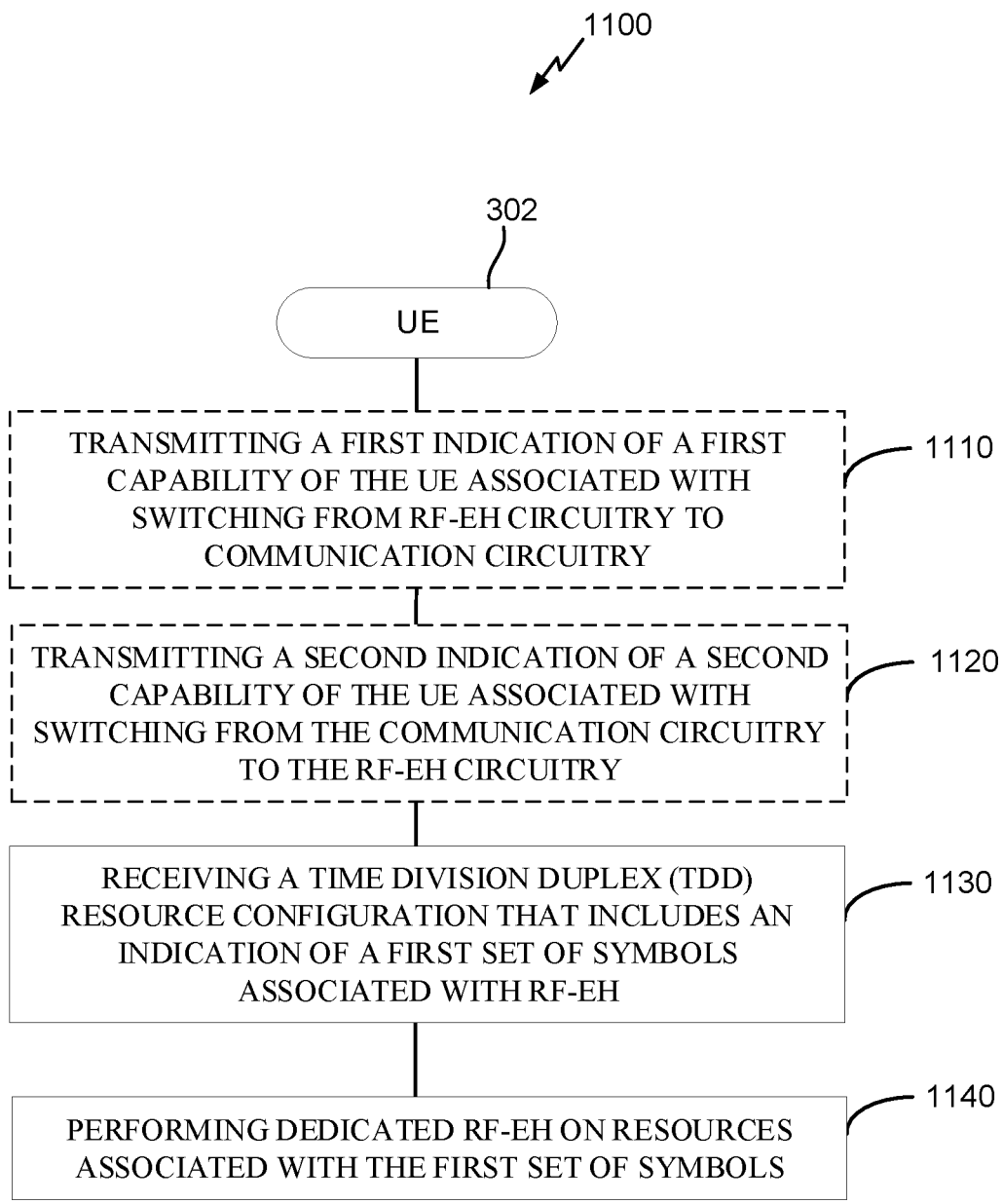
FIG. 11 illustrates an exemplary process of RF-EH, according to aspects of the disclosure.

FIG. 11 illustrates an exemplary process 1100 of RF-EH, according to aspects of the disclosure. In an aspect, the process 1100 may be performed by an RF-EH-capable UE, such as UE 302, UE 400, etc.

Referring to FIG. 11, at 1110, the UE (e.g., transmitter 314 or 324, antenna 410, transceiver 412, etc.) optionally transmits a first indication of a first capability of the UE associated with switching from RF-EH circuitry to communication circuitry. In some designs, the first indication may be transmitted via RRC signaling. In some designs, the first indication of the first capability may be evaluated by an entity that configures a TDD resource configuration for RF-EH so as to ensure that a sufficient gap is defined between a symbol associated with RF-EH (or "E" symbol) and a symbol for communication (e.g., "D" symbol, "U" symbol, "F" symbol, etc.).

Referring to FIG. 11, at 1120, the UE (e.g., transmitter 314 or 324, antenna 410, transceiver 412, etc.) optionally transmits a second indication of a second capability of the UE associated with switching from the communication circuitry to the RF-EH circuitry. In some designs, the second indication may be transmitted via RRC signaling. In some designs, the second indication of the second capability may be evaluated by an entity that configures a TDD resource configuration for RF-EH so as to ensure that a sufficient gap is defined between a symbol for communication (e.g., "D" symbol, "U" symbol, "F" symbol, etc.) and a symbol associated with RF-EH (or "E" symbol).

Referring to FIG. 11, at 1130, the UE (e.g., receiver 312 or 322, antenna 410, transceiver 412, etc.) receives a TDD resource configuration that includes an indication of a first set of symbols associated with RF-EH. In some designs, the first set of symbols includes contiguous symbols within a slot. However, in other designs, some symbols associated with RF-EH may be separated (or non-contiguous) (e.g., different groups of E symbols in different symbol blocks separated by one or more symbols for communication and associated gaps, etc.). In some designs, the TDD resource configuration also optionally includes an indication of a second set of symbols associated with communication. In some designs, the second set of symbols associated with communication is optional because the TDD resource configuration could be fully allocated to E symbols in some designs. In some designs, the TDD resource configuration is associated with sidelink communication (e.g., UE-to-UE). However, in other designs, the TDD resource configuration may be associated with downlink communication (e.g., gNB-to-UE).

Referring to FIG. 11, at 1140, the UE (e.g., receiver 312 or 322, RF-EH circuitry 342 or 406, antenna 408, etc.) performs dedicated RF-EH on resources associated with the first set of symbols. For example, even if RF power can be allocated to communication as in FIGS. 6A-6B, the dedicated RF-EH may route all received RF power to RF-EH circuitry (e.g., via a time-switch or a dedicated power-split).

Figure 12:
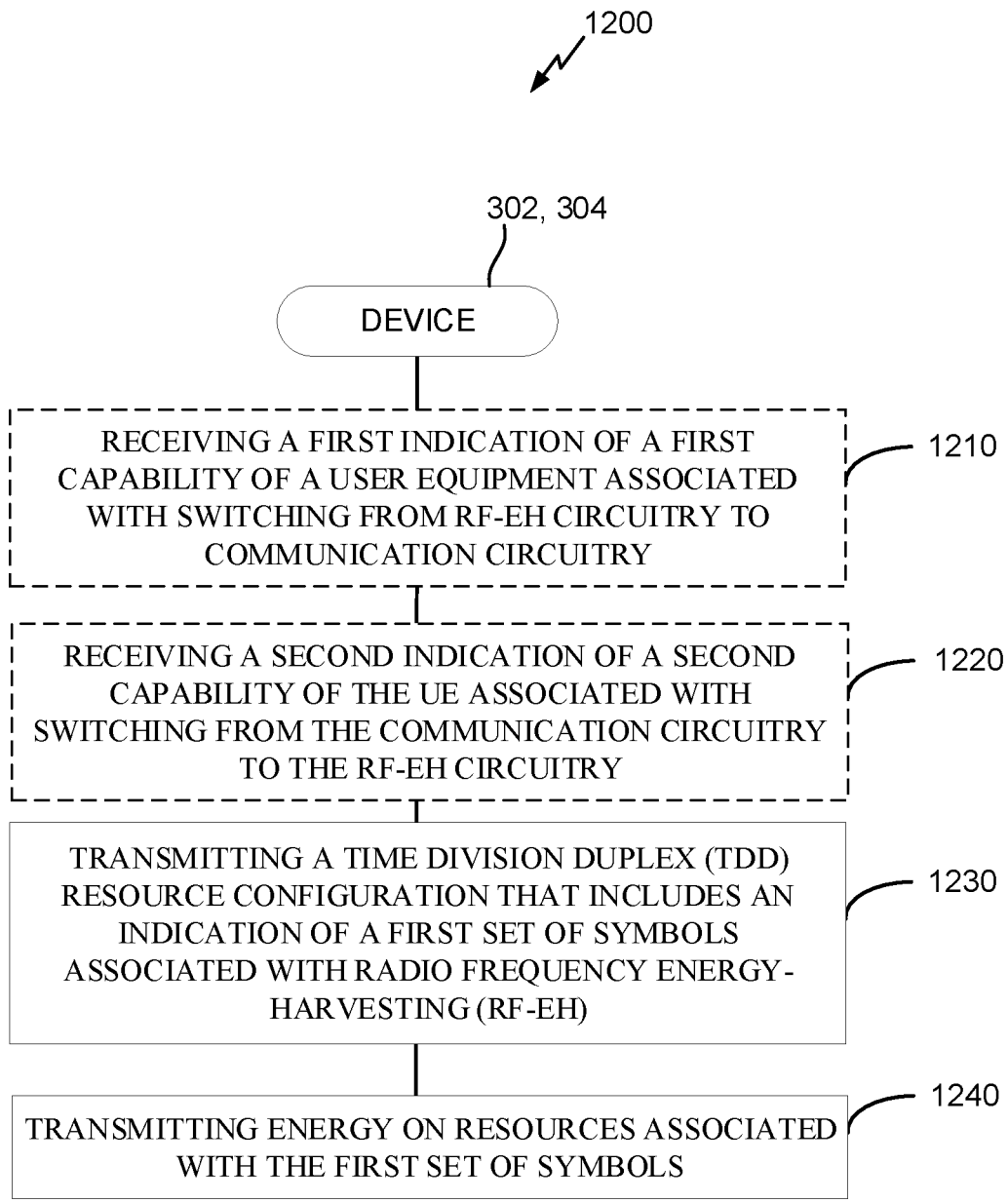
FIG. 12 illustrates an exemplary process of wireless communication, according to aspects of the disclosure.

FIG. 12 illustrates an exemplary process 1200 of wireless communication, according to aspects of the disclosure. In an aspect, the process 1200 may be performed by a device, such as UE 302 or BS 304. Generally, the device that performs the process 1200 of FIG. 12 may be any device capable of wireless transmission.

Referring to FIG. 12, at 1210, the device (e.g., receiver 312 or 322 or 352 or 362, etc.) optionally receives a first indication of a first capability of a user equipment associated with switching from RF-EH circuitry to communication circuitry. In some designs, the first indication may be received via RRC signaling. In some designs, the device may use the first indication of the first capability to configure a TDD resource configuration for RF-EH so as to ensure that a sufficient gap is defined between a symbol associated with RF-EH (or "E" symbol) and a symbol for communication (e.g., "D" symbol, "U" symbol, "F" symbol, etc.).

Referring to FIG. 12, at 1220, the device (e.g., receiver 312 or 322 or 352 or 362, etc.) optionally receives a second indication of a second capability of the UE associated with switching from the communication circuitry to the RF-EH circuitry. In some designs, the second indication may be transmitted via RRC signaling. In some designs, the device may use the second indication of the second capability to configure a TDD resource configuration for RF-EH so as to ensure that a sufficient gap is defined between a symbol for communication (e.g., "D" symbol, "U" symbol, "F" symbol, etc.) and a symbol associated with RF-EH (or "E" symbol).

Referring to FIG. 12, at 1230, the device (e.g., transmitter 314 or 324 or 354 or 364, etc.) transmits a TDD resource configuration that includes an indication of a first set of symbols associated with RF-EH. In some designs, the first set of symbols includes contiguous symbols within a slot. However, in other designs, some symbols associated with RF-EH may be separated (or non-contiguous) (e.g., different groups of E symbols in different symbol blocks separated by one or more symbols for communication and associated gaps, etc.). In some designs, the TDD resource configuration also optionally includes an indication of a second set of symbols associated with communication. In some designs, the second set of symbols associated with communication is optional because the TDD resource configuration could be fully allocated to E symbols in some designs. In some designs, the TDD resource configuration is associated with sidelink communication (e.g., UE-to-UE). However, in other designs, the TDD resource configuration may be associated with downlink communication (e.g., gNB-to-UE).

Referring to FIG. 12, at 1240, the device (e.g., transmitter 314 or 324 or 354 or 364, etc.) transmits energy on resources associated with the first set of symbols. As noted above, in some designs, the TDD resource configuration may include an indication of a second set of symbols associated with communication. In this case, in some designs, the first set of symbols may be associated with a first transmission power level, and the second set of symbols may be associated with a second transmission power level that is lower than the first transmission power level (e.g., E symbols are transmitted with more power to increase or maximize power transmission to one or more RF-EH-capable UEs).

Referring to FIGS. 11-12, in some designs as noted above, the TDD resource configuration may further include an indication of a second set of symbols associated with communication. In some designs, the TDD resource configuration may include one or more gaps arranged between the first and second sets of symbols. In some designs, a duration of the one or more gaps is based upon a capability of the UE (e.g., the first indication of the first capability, the second indication of the second capability, or a combination thereof). In some designs, the first set of symbols is associated with a first transmission power level, and the second set of symbols is associated with a second transmission power level that is lower than the first transmission power level (e.g., E symbols are transmitted with more power to increase or maximize power transmission to one or more RF-EH-capable UEs).

Referring to FIGS. 11-12, in some designs, the TDD resource configuration indicates that the first set of symbols is associated with RF-EH periodically, aperiodically, or semi-persistently. In some designs, the TDD resource configuration is received via downlink DCI, RRC, or MAC-CE.

Referring to FIGS. 11-12, in some designs, the first set of symbols may be indicated in different ways. For example, in some designs, the first set of symbols may be indicated via an express designated of particular symbols (e.g., symbols 4-8, symbols 2-9, etc.) of a slot (e.g., a 14 symbol slot). In other designs, the TDD resource configuration may include an indication of energy amount, and from a starting symbol (e.g., which may be designated, such as starting symbol 2 or 4 or 6, etc.), the first set of symbols includes successive symbols until an aggregate of energy across the first set of symbols reaches or exceeds the energy amount. For example, the RF-EH-capable UE may assume that E symbols are transmitted at some pre-defined transmission power level, and may aggregate the power at each successive symbol until the indicated energy amount is reached. In other designs, the TDD resource configuration includes an indication of a starting symbol (e.g., which may be designated, such as starting symbol 2 or 4 or 6, etc.), and, from the starting symbol, the first set of symbols includes successive symbols until an RF-EH release DCI is received. In this case, the TDD resource configuration indicates the first set of symbols in combination with the RF-EH release DCI since the end-point or stop-point for the first set of symbols is not expressly designated by the TDD resource configuration.

Referring to FIGS. 11-12, in some designs, the first set of symbols is associated with RF-EH for the UE only (e.g., unicast as in FIG. 9C), or the first set of symbols is associated with RF-EH for a group of UEs including the UE (e.g., groupcast or multicast as in FIG. 9B, or the first set of symbols is associated with RF-EH for broadcast charging of any RF-EH-capable UE in proximity to a device transmitting upon the first set of symbols (e.g., broadcast as in FIG. 9A).

Referring to FIGS. 11-12, in some designs, an initial TDD resource configuration designates one or more symbols among the first set of symbols as associated with communication, and the TDD resource configuration reconfigures the one or more symbols as associated with RF-EH. In a sidelink-specific example, the TDD resource configuration may reconfigure the one or more symbols as associated with RF-EH is received via slot format indicator (SFI) DCI. In a further example, the initial TDD resource configuration designates one or more symbols among the first set of symbols as one or more downlink (D) symbols, one or more flexible (F) symbols, or a combination thereof.

Referring to FIGS. 11-12, in some designs, RF-EH is performed in signal analog domain. So, in some designs, if the RF-EH-capable UE (e.g., wearable device, etc.) is using time switching or splitting RF-EH technique, E symbols cannot be at the middle of the allocations, but must be either at the beginning or the end of the slot. In some cases, the TDD pattern could have symbol gaps (e.g., each with one or more symbols, based on UE capability) between the E symbols and other symbols for communication, such as D or U or F symbols ("D" or "U").

Figure 13A:
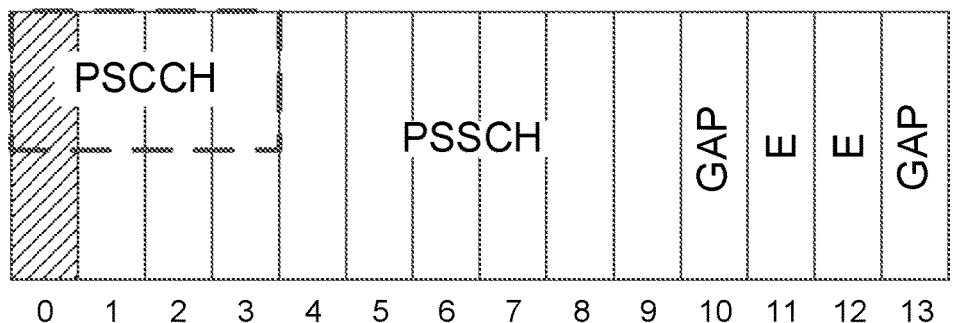
FIG. 13A illustrates a TDD resource configuration in accordance with an aspect of the disclosure.

FIG. 13A illustrates a TDD resource configuration 1300A in accordance with an aspect of the disclosure. In particular, the TDD resource configuration 1300A is associated with sidelink (PC5) communication. The TDD resource configuration 1300A includes 14 OFDM symbols denoted as symbols 0 through 13. In the TDD resource configuration 1300A of FIG. 1300A, E symbols are configured at symbols 11-12, with a gap symbol 10 separating the E symbols from PSSCH. It will be appreciated that the TDD resource configuration 1300A constitutes one particular example TDD resource configuration, and various TDD resource configurations with E symbols may be used in other aspects of the disclosure.

Figure 13B:
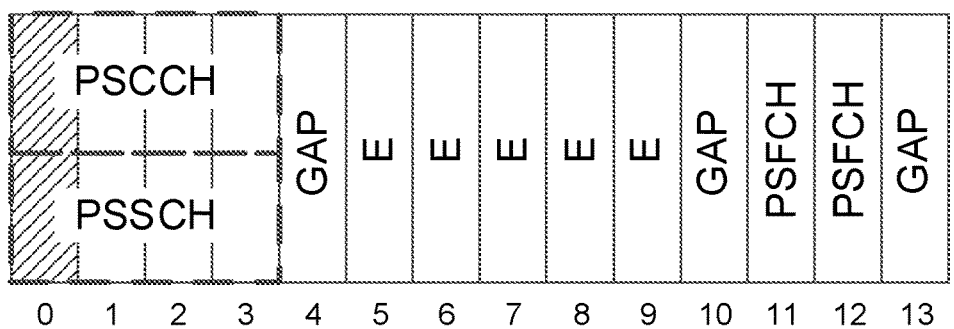
FIG. 13B illustrates a TDD resource configuration in accordance with an aspect of the disclosure.

FIG. 13B illustrates a TDD resource configuration 1300B in accordance with an aspect of the disclosure. In particular, the TDD resource configuration 1300B is associated with sidelink (PC5) communication. The TDD resource configuration 1300B includes 14 OFDM symbols denoted as symbols 0 through 13. In the TDD resource configuration 1300B of FIG. 1300B, E symbols are configured at symbols 5-9, with a gap symbol 4 separating the E symbols from PSSCH/PSSCH, and a gap symbol 10 separating the E symbols from PSFCH. It will be appreciated that the TDD resource configuration 1300B constitutes one particular example TDD resource configuration, and various TDD resource configurations with E symbols may be used in other aspects of the disclosure.

Figure 13C:
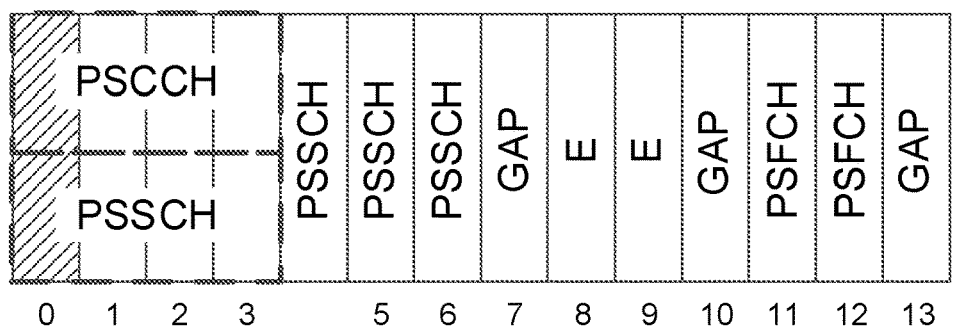
FIG. 13C illustrates a TDD resource configuration in accordance with an aspect of the disclosure.

FIG. 13C illustrates a TDD resource configuration 1300C in accordance with an aspect of the disclosure. In particular, the TDD resource configuration 1300C is associated with sidelink (PC5) communication. The TDD resource configuration 1300C includes 14 OFDM symbols denoted as symbols 0 through 13. In the TDD resource configuration 1300C of FIG. 1300C, E symbols are configured at symbols 8-9, with a gap symbol 7 separating the E symbols from PSSCH/PSSCH, and a gap symbol 10 separating the E symbols from PSFCH. It will be appreciated that the TDD resource configuration 1300C constitutes one particular example TDD resource configuration, and various TDD resource configurations with E symbols may be used in other aspects of the disclosure.

Figure 13D:
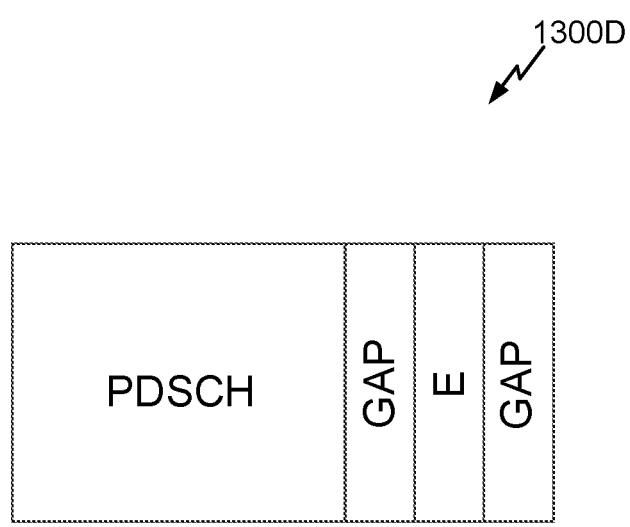
FIG. 13D illustrates a TDD resource configuration in accordance with an aspect of the disclosure.

FIG. 13D illustrates a TDD resource configuration 1300D in accordance with an aspect of the disclosure. In particular, the TDD resource configuration 1300D is associated with Uu (e.g., downlink or gNB-to-UE) communication. In the TDD resource configuration 1300D of FIG. 1300D, a block of E symbols is separated from PDSCH by a gap of one or more symbols. It will be appreciated that the TDD resource configuration 1300D constitutes one particular example TDD resource configuration, and various TDD resource configurations with E symbols may be used in other aspects of the disclosure.

Figure 14:
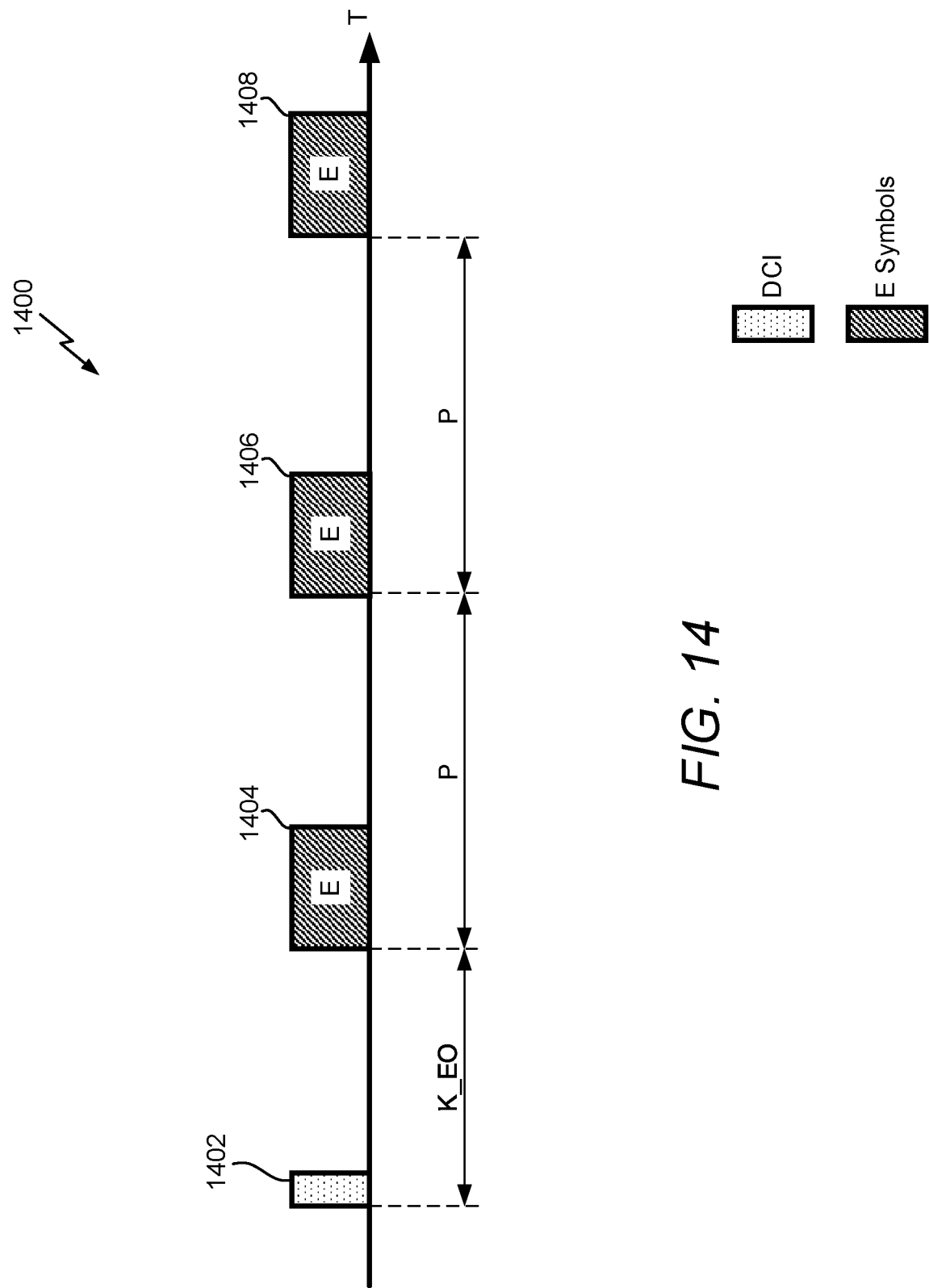
FIG. 14 illustrates an E symbol scheduling scenario in accordance with an aspect of the disclosure.

FIG. 14 illustrates an E symbol scheduling scenario 1400 in accordance with an aspect of the disclosure. As noted above, E symbols can be scheduled periodically, aperiodically or semi-persistently across symbols, sub-slots, or slots.

In FIG. 14, a new DCI is depicted at 1402, which may be characterized as an EH activation/reactivation DCI, may schedule E symbol blocks at 1404, 1406 and 1408. The gNB may signal K_E0 (the time between end of DCI to the beginning of the E symbols) and p (periodicity of E resources) and number of resources M (e.g., number of symbols or energy amount, etc.). In some designs, M and p may be RRC/MAC-CE or DCI configured, and K_E0 is DCI configured. In some designs, configuration of each resource (e.g., RBs, OFDM symbols, etc.) may be in TDRA/RB allocation signaled in DCI/SCI (e.g., alternatively, the RF-EH resources may be configured in RRC/MAC-CE). As noted above, in some designs, transmissions on the E symbol blocks at 1404, 1406 and 1408 may be associated with a higher transmission power as compared to one or more other symbols for communication.

In some designs, the TDD resource configuration is associated with sidelink communication (e.g., UE-to-UE). However, in other designs, the TDD resource configuration may be associated with downlink communication (e.g., gNB-to-UE).

Figure 15:
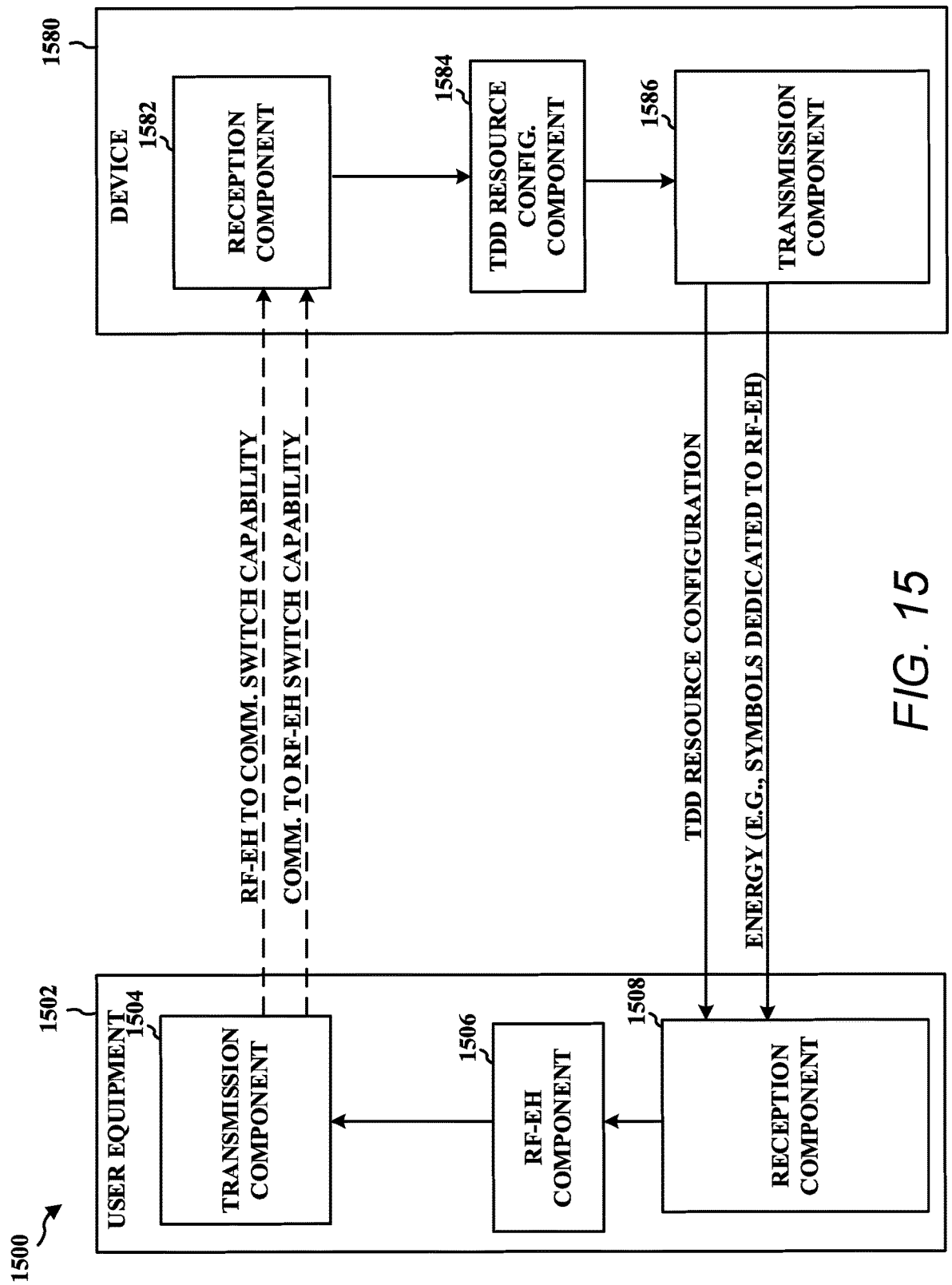
FIG. 15 is a conceptual data flow diagram illustrating the data flow between different means/components in exemplary apparatuses in accordance with an aspect of the disclosure.

FIG. 15 is a conceptual data flow diagram 1500 illustrating the data flow between different means/components in exemplary apparatuses 1502 and 1580 in accordance with an aspect of the disclosure. The apparatus 1502 may be a UE (e.g., UE 302) in communication with an apparatus 1580, which may be a device capable of wireless transmission (e.g., UE 302, BS 304).

The apparatus 1502 includes a transmission component 1504, which may correspond to transmitter circuitry in UE 302 as depicted in FIG. 3A, including transmitter(s) 314 and 324, antenna(s) 316 and 326, etc. The apparatus 1502 further includes RF-EH component 1506, which may correspond RF-EH circuitry 342 or 406, or an associated processing system such as processing system 332. The apparatus 1502 further includes a reception component 1508, which may correspond to receiver circuitry in UE 302 as depicted in FIG. 3A, including receiver(s) 312 and 322, antenna(s) 316 and 326, etc.

The apparatus 1580 includes a transmission component 1586, which may correspond to transmitter circuitry in UE 302 or BS 304 as depicted in FIG. 3A or FIG. 3B, including transmitter(s) 314 and 324 or 354 and 364, antenna(s) 316 and 326 or 356 and 366, etc. The apparatus 1580 further includes TDD resource configuration component 1584, which may correspond to processor circuitry in UE 302 or BS 304 as depicted in FIG. 3A or FIG. 3B, including processing system 332 or 384, etc. The apparatus 1580 further includes a reception component 1582, which may correspond to receiver circuitry in UE 302 or BS 304 as depicted in FIG. 3A or FIG. 3B, including receiver(s) 312 and 322 or 352 and 362, antenna(s) 316 and 326 or 356 and 366, etc.

Referring to FIG. 15, the transmission component 1504 optionally transmits indications of an RF-EH to communication switch capability and/or communication to RF-EH switch capability to the reception component 1582, which forwards the optionally indications to the TDD resource configuration component 1584. The TDD resource configuration component 1584 determines a TDD resource configuration (e.g., based on the optional capability indications) which includes one or more E symbols. The transmission component 1586 transmits the TDD resource configuration to the reception component 1508. The transmission component 1586 further transmits energy at least on the E symbols configured via the TDD resource configuration, The reception component 1508 receives the energy on the E symbols, which is harvested by the RF-EH component 1506.

One or more components of the apparatus 1502 and apparatus 1580 may perform each of the blocks of the algorithm in the aforementioned flowcharts of FIGS. 11-12. As such, each block in the aforementioned flowcharts of FIGS. 11-12 may be performed by a component and the apparatus 1502 and apparatus 1580 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
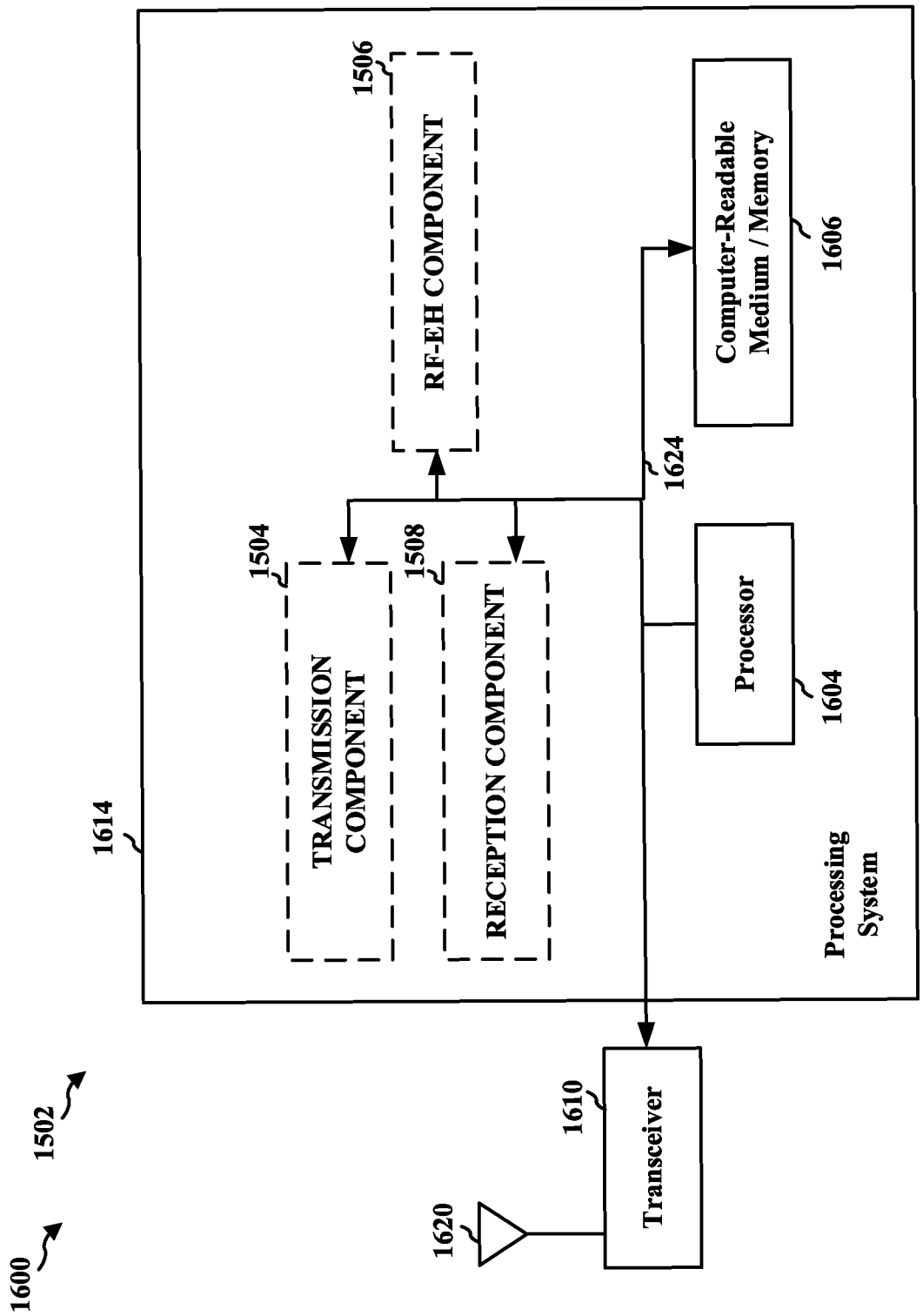
FIG. 16 is a diagram illustrating an example of a hardware implementation for an apparatus employing a processing system.

FIG. 16 is a diagram 1600 illustrating an example of a hardware implementation for an apparatus 1502 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506 and 1508, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1508. In addition, the transceiver 1610 receives information from the processing system 1614, specifically the transmission component 1504, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506 and 1508. The components may be software components running in the processor 1604, resident/stored in the computer readable medium/memory 1606, one or more hardware components coupled to the processor 1604, or some combination thereof.

In one configuration, the apparatus 1502 (e.g., a UE) for wireless communication includes means for receiving a time division duplex (TDD) resource configuration that includes an indication of a first set of symbols associated with RF-EH, and means for performing dedicated RF-EH on resources associated with the first set of symbols.

The aforementioned means may be one or more of the aforementioned components of the apparatus 1502 and/or the processing system 1614 of the apparatus 1502 configured to perform the functions recited by the aforementioned means.

FIG. 17 is a diagram 1700 illustrating an example of a hardware implementation for an apparatus 1580 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1582, 1584 and 1586, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1582. In addition, the transceiver 1710 receives information from the processing system 1714, specifically the transmission component 1586, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1582, 1584 and 1586. The components may be software components running in the processor 1704, resident/stored in the computer readable medium/memory 1706, one or more hardware components coupled to the processor 1704, or some combination thereof.

In one configuration, the apparatus 1580 (e.g., a BS or UE) for wireless communication may include means for transmitting a time division duplex (TDD) resource configuration that includes an indication of a first set of symbols associated with radio frequency energy-harvesting (RF-EH), and means for transmitting energy on resources associated with the first set of symbols.

The aforementioned means may be one or more of the aforementioned components of the apparatus 1580 and/or the processing system 1714 of the apparatus 1580 configured to perform the functions recited by the aforementioned means.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE) that is radio frequency energy-harvesting (RF-EH)-capable, comprising: receiving a time division duplex (TDD) resource configuration that includes an indication of a first set of symbols associated with RF-EH; and performing dedicated RF-EH on resources associated with the first set of symbols.

Clause 2. The method of clause 1, wherein the first set of symbols comprises contiguous symbols within a slot.

Clause 3. The method of any of clauses 1 to 2, wherein the TDD resource configuration further includes an indication of a second set of symbols associated with communication.

Clause 4. The method of clause 3, wherein the TDD resource configuration includes one or more gaps arranged between the first and second sets of symbols.

Clause 5. The method of clause 4, wherein a duration of the one or more gaps is based upon a capability of the UE.

Clause 6. The method of any of clauses 3 to 5, wherein the first set of symbols is associated with a first transmission power level, and wherein the second set of symbols is associated with a second transmission power level that is lower than the first transmission power level.

Clause 7. The method of any of clauses 1 to 6, wherein the TDD resource configuration indicates that the first set of symbols is associated with RF-EH periodically, aperiodically, or semi-persistently.

Clause 8. The method of any of clauses 1 to 7, wherein the TDD resource configuration is received via downlink control information (DCI), radio resource control (RRC), or medium access control command element (MAC-CE).

Clause 9. The method of any of clauses 1 to 8, wherein the TDD resource configuration includes an indication of energy amount, and wherein, from a starting symbol, the first set of symbols includes successive symbols until an aggregate of energy across the first set of symbols reaches or exceeds the energy amount.

Clause 10. The method of any of clauses 1 to 9, wherein the TDD resource configuration includes an indication of a starting symbol, wherein, from the starting symbol, the first set of symbols includes successive symbols until an RF-EH release downlink control indication (DCI) is received.

Clause 11. The method of any of clauses 1 to 10, wherein the first set of symbols is associated with RF-EH for the UE only, or wherein the first set of symbols is associated with RF-EH for a group of UEs including the UE, or wherein the first set of symbols is associated with RF-EH for broadcast charging of any RF-EH-capable UE in proximity to a device transmitting upon the first set of symbols.

Clause 12. The method of any of clauses 1 to 11, wherein an initial TDD resource configuration designates one or more symbols among the first set of symbols as associated with communication, and wherein the TDD resource configuration reconfigures the one or more symbols as associated with RF-EH.

Clause 13. The method of clause 12, wherein the TDD resource configuration that reconfigures the one or more symbols as associated with RF-EH is received via slot format indicator (SFI) downlink control information (DCI).

Clause 14. The method of any of clauses 12 to 13, wherein the initial TDD resource configuration designates one or more symbols among the first set of symbols as one or more downlink (D) symbols, one or more flexible (F) symbols, or a combination thereof.

Clause 15. The method of any of clauses 1 to 14, further comprising: transmitting a first indication of a first capability of the UE associated with switching from RF-EH circuitry to communication circuitry, or transmitting a second indication of a second capability of the UE associated with switching from the communication circuitry to the RF-EH circuitry, or a combination thereof.

Clause 16. The method of clause 15, wherein the TDD resource configuration is based in part upon the first indication, the second indication, or both.

Clause 17. A method of operating a device, comprising: transmitting a time division duplex (TDD) resource configuration that includes an indication of a first set of symbols associated with radio frequency energy-harvesting (RF-EH); and transmitting energy on resources associated with the first set of symbols.

Clause 18. The method of clause 17, wherein the first set of symbols comprises contiguous symbols within a slot.

Clause 19. The method of any of clauses 17 to 18, wherein the TDD resource configuration further includes an indication of a second set of symbols associated with communication.

Clause 20. The method of clause 19, wherein the TDD resource configuration includes one or more gaps arranged between the first and second sets of symbols.

Clause 21. The method of any of clauses 19 to 20, wherein the energy is transmitted on the first set of symbols at a first transmission power level, and wherein data is transmitted on the second set of symbols at a second transmission power level that is lower than the first transmission power level.

Clause 22. The method of any of clauses 17 to 21, wherein the TDD resource configuration indicates that the first set of symbols is associated with RF-EH periodically, aperiodically, or semi-persistently.

Clause 23. The method of any of clauses 17 to 22, wherein the TDD resource configuration includes an indication of energy amount, and wherein, from a starting symbol, the first set of symbols includes successive symbols until an aggregate of energy across the first set of symbols reaches or exceeds the energy amount.

Clause 24. The method of any of clauses 17 to 23, wherein the TDD resource configuration includes an indication of a starting symbol, and wherein, from the starting symbol, the first set of symbols includes successive symbols until an RF-EH release downlink control indication (DCI) is received.

Clause 25. The method of any of clauses 17 to 24, wherein the first set of symbols is associated with RF-EH for one particular user equipment (UE) only, or wherein the first set of symbols is associated with RF-EH for a group of UEs, or wherein the first set of symbols is associated with RF-EH for broadcast charging of any RF-EH-capable UE in proximity to the device.

Clause 26. The method of any of clauses 17 to 25, wherein an initial TDD resource configuration designates one or more symbols among the first set of symbols as associated with communication, and wherein the TDD resource configuration reconfigures the one or more symbols as associated with RF-EH.

Clause 27. The method of any of clauses 17 to 26, further comprising: receiving a first indication of a first capability of a user equipment associated with switching from RF-EH circuitry to communication circuitry, or receiving a second indication of a second capability of the UE associated with switching from the communication circuitry to the RF-EH circuitry, or a combination thereof.

Clause 28. The method of clause 27, wherein the TDD resource configuration is based in part upon the first indication, the second indication, or both.

Clause 29. An apparatus comprising a memory and at least one processor communicatively coupled to the memory, the memory and the at least one processor configured to perform a method according to any of clauses 1 to 28.

Clause 30. An apparatus comprising means for performing a method according to any of clauses 1 to 28.

Clause 31. A non-transitory computer-readable medium storing computer-executable instructions, the computer-executable comprising at least one instruction for causing a computer or processor to perform a method according to any of clauses 1 to 28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A user equipment (UE), comprising:
a memory;
a communication interface; and
at least one processor communicatively coupled to the memory and the communication interface, wherein the at least one processor is configured to:
receive, via the communication interface, a time division duplex (TDD) resource configuration that includes an indication of a first set of symbols associated with radio frequency energy-harvesting (RF-EH), wherein the TDD resource configuration includes an indication of energy amount, and wherein, from a starting symbol, the first set of symbols includes successive symbols until an aggregate of energy across the first set of symbols reaches or exceeds the energy amount; and
perform dedicated RF-EH on resources associated with the first set of symbols.

2. The UE of claim 1, wherein the first set of symbols comprises contiguous symbols within a slot.

3. The UE of claim 1, wherein the TDD resource configuration further includes an indication of a second set of symbols associated with communication.

4. The UE of claim 3, wherein the TDD resource configuration includes one or more gaps arranged between the first set of symbols and the second sets of symbols.

5. The UE of claim 4, wherein a duration of the one or more gaps is based upon a capability of the UE.

6. The UE of claim 3,
wherein the first set of symbols is associated with a first transmission power level, and
wherein the second set of symbols is associated with a second transmission power level that is lower than the first transmission power level.

7. The UE of claim 1, wherein the TDD resource configuration indicates that the first set of symbols is associated with RF-EH periodically, aperiodically, or semi-persistently.

8. The UE of claim 1, wherein, to receive the TDD resource configuration via the communication interface, the at least one processor is configured to receive, via the communication interface, the TDD resource configuration via downlink control information (DCI), radio resource control (RRC), or medium access control command element (MAC-CE).

9. The UE of claim 1, wherein the TDD resource configuration includes an indication of the starting symbol.

10. The UE of claim 1,
wherein the first set of symbols is associated with RF-EH for a group of UEs including the UE, or
wherein the first set of symbols is associated with RF-EH for broadcast charging of any RF-EH-capable UE.

11. The UE of claim 1,
wherein an initial TDD resource configuration designates one or more symbols among the first set of symbols as associated with communication, and
wherein the TDD resource configuration reconfigures the one or more symbols as associated with RF-EH.

12. The UE of claim 11, wherein, to receive the TDD resource configuration via the communication interface, the at least one processor is configured to receive, via the communication interface, the TDD resource configuration the via slot format indicator (SFI) downlink control information (DCI).

13. The UE of claim 11, wherein the initial TDD resource configuration designates the one or more symbols among the first set of symbols as one or more downlink (D) symbols, one or more flexible (F) symbols, or a combination thereof.

14. The UE of claim 1, wherein the at least one processor is configured to:
cause the communication interface to transmit a first indication of a first capability of the UE associated with switching from RF-EH circuitry to communication circuitry, or
cause the communication interface to transmit a second indication of a second capability of the UE associated with switching from the communication circuitry to the RF-EH circuitry, or
a combination thereof.

15. The UE of claim 14, wherein the TDD resource configuration is based in part upon the first indication, the second indication, or both.

16. A method of operating a device, comprising:
a memory;
a communication interface; and
at least one processor communicatively coupled to the memory and the communication interface, wherein the at least one processor is configured to:
cause the communication interface to transmit a time division duplex (TDD) resource configuration that includes an indication of a first set of symbols associated with radio frequency energy-harvesting (RF-EH), wherein the TDD resource configuration includes an indication of energy amount, and wherein, from a starting symbol, the first set of symbols includes successive symbols until an aggregate of energy across the first set of symbols reaches or exceeds the energy amount; and
cause the communication interface to transmit energy on resources associated with the first set of symbols.

17. The device of claim 16, wherein the first set of symbols comprises contiguous symbols within a slot.

18. The device of claim 16, wherein the TDD resource configuration further includes an indication of a second set of symbols associated with communication.

19. The device of claim 18, wherein the TDD resource configuration includes one or more gaps arranged between the first set of symbols and the second sets of symbols.

20. The device of claim 18, wherein, to cause the communication interface to transmit the energy on the resources associated with the first set of symbols, the at least one processor is configured to cause the communication interface to transmit the energy on the resources at a first transmission power level, and wherein the at least one processor is configured to transmit data on the second set of symbols at a second transmission power level that is lower than the first transmission power level.

21. The device of claim 16, wherein the TDD resource configuration indicates that the first set of symbols is associated with RF-EH periodically, aperiodically, or semi-persistently.

22. The device of claim 16, wherein the TDD resource configuration includes an indication of the starting symbol.

23. The device of claim 16,
wherein the first set of symbols is associated with RF-EH for a group of UEs, or
wherein the first set of symbols is associated with RF-EH for broadcast charging of any RF-EH-capable UE.

24. The device of claim 16,
wherein an initial TDD resource configuration designates one or more symbols among the first set of symbols as associated with communication, and
wherein the TDD resource configuration reconfigures the one or more symbols as associated with RF-EH.

25. The device of claim 16, wherein the at least one processor is configured to:
receive, via the communication interface, a first indication of a first capability of a user equipment associated with switching from RF-EH circuitry to communication circuitry, or
receive, via the communication interface, a second indication of a second capability of the UE associated with switching from the communication circuitry to the RF-EH circuitry, or
a combination thereof.

26. The device of claim 25, wherein the TDD resource configuration is based in part upon the first indication, the second indication, or both.

27. A user equipment (UE), comprising:
a memory;
a communication interface; and
at least one processor communicatively coupled to the memory and the communication interface, wherein the at least one processor is configured to:
receive, via the communication interface, a time division duplex (TDD) resource configuration that includes an indication of a first set of symbols associated with radio frequency energy-harvesting (RF-EH), wherein, from a starting symbol, the first set of symbols includes successive symbols until an RF-EH release indication is received; and
perform dedicated RF-EH on resources associated with the first set of symbols.

28. The UE of claim 27, wherein the first set of symbols comprises contiguous symbols within a slot.

29. The UE of claim 27, wherein the TDD resource configuration further includes an indication of a second set of symbols associated with communication.

30. The UE of claim 29, wherein the TDD resource configuration includes one or more gaps arranged between the first set of symbols and the second sets of symbols.

31. The UE of claim 30, wherein a duration of the one or more gaps is based upon a capability of the UE.

32. The UE of claim 29,
wherein the first set of symbols is associated with a first transmission power level, and
wherein the second set of symbols is associated with a second transmission power level that is lower than the first transmission power level.

33. The UE of claim 27, wherein the TDD resource configuration indicates that the first set of symbols is associated with RF-EH periodically, aperiodically, or semi-persistently.

34. The UE of claim 27, wherein, to receive the TDD resource configuration via the communication interface, the at least one processor is configured to receive, via the communication interface, the TDD resource configuration via downlink control information (DCI), radio resource control (RRC), or medium access control command element (MAC-CE).

35. The UE of claim 27, wherein the TDD resource configuration includes an indication of the starting symbol.

36. The UE of claim 27,
wherein the first set of symbols is associated with RF-EH for a group of UEs including the UE, or
wherein the first set of symbols is associated with RF-EH for broadcast charging of any RF-EH-capable UE.

37. The UE of claim 27,
wherein an initial TDD resource configuration designates one or more symbols among the first set of symbols as associated with communication, and
wherein the TDD resource configuration reconfigures the one or more symbols as associated with RF-EH.

38. The UE of claim 37, wherein, to receive the TDD resource configuration via the communication interface, the at least one processor is configured to receive, via the communication interface, the TDD resource configuration via slot format indicator (SFI) downlink control information (DCI).

39. The UE of claim 37, wherein the initial TDD resource configuration designates the one or more symbols among the first set of symbols as one or more downlink (D) symbols, one or more flexible (F) symbols, or a combination thereof.

40. The UE of claim 27, wherein the at least one processor is configured to:
cause the communication interface to transmit a first indication of a first capability of the UE associated with switching from RF-EH circuitry to communication circuitry, or
cause the communication interface to transmit a second indication of a second capability of the UE associated with switching from the communication circuitry to the RF-EH circuitry, or
a combination thereof.

41. The UE of claim 40, wherein the TDD resource configuration is based in part upon the first indication, the second indication, or both.

42. A device, comprising:
a memory;
a communication interface; and
at least one processor communicatively coupled to the memory and the communication interface, wherein the at least one processor is configured to:
cause the communication interface to transmit a time division duplex (TDD) resource configuration that includes an indication of a first set of symbols associated with radio frequency energy-harvesting (RF-EH), wherein, from a starting symbol, the first set of symbols includes successive symbols until an RF-EH release indication; and
cause the communication interface to transmit energy on resources associated with the first set of symbols.

43. The device of claim 42, wherein the first set of symbols comprises contiguous symbols within a slot.

44. The device of claim 42, wherein the TDD resource configuration further includes an indication of a second set of symbols associated with communication.

45. The device of claim 44, wherein the TDD resource configuration includes one or more gaps arranged between the first set of symbols and the second sets of symbols.

46. The device of claim 44, wherein, to cause the communication interface to transmit the energy on the resources associated with the first set of symbols, the at least one processor is configured to cause the communication interface to transmit the energy on the resources at a first transmission power level, and wherein the at least one processor is configured to transmit data on the second set of symbols at a second transmission power level that is lower than the first transmission power level.

47. The device of claim 42, wherein the TDD resource configuration indicates that the first set of symbols is associated with RF-EH periodically, aperiodically, or semi-persistently.

48. The UE of claim 42, wherein the TDD resource configuration includes an indication of the starting symbol.

49. The device of claim 42,
wherein the first set of symbols is associated with RF-EH for a group of UEs, or
wherein the first set of symbols is associated with RF-EH for broadcast charging of any RF-EH-capable UE.

50. The device of claim 42,
wherein an initial TDD resource configuration designates one or more symbols among the first set of symbols as associated with communication, and
wherein the TDD resource configuration reconfigures the one or more symbols as associated with RF-EH.

51. The device of claim 42, wherein the at least one processor is configured to:
receive, via the communication interface, a first indication of a first capability of a user equipment associated with switching from RF-EH circuitry to communication circuitry, or
receive, via the communication interface, a second indication of a second capability of the UE associated with switching from the communication circuitry to the RF-EH circuitry, or
a combination thereof.

52. The device of claim 51, wherein the TDD resource configuration is based in part upon the first indication, the second indication, or both.

* * * * *